(12) United States Patent
Chen et al.

(10) Patent No.: US 10,615,919 B2
(45) Date of Patent: Apr. 7, 2020

(54) DEVICE AND METHOD IN WIRELESS COMMUNICATION SYSTEM

(71) Applicant: Sony Corporation, Tokyo (JP)

(72) Inventors: Jinhui Chen, Beijing (CN); Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/190,169

(22) Filed: Nov. 14, 2018

(65) Prior Publication Data
US 2019/0081738 A1 Mar. 14, 2019

Related U.S. Application Data

(63) Continuation of application No. 15/743,312, filed as application No. PCT/CN2016/094856 on Aug. 12, 2016, now Pat. No. 10,177,880.

(30) Foreign Application Priority Data

Aug. 14, 2015 (CN) .......................... 2015 1 0501585

(51) Int. Cl.
*H04L 1/18* (2006.01)
*H04W 52/34* (2009.01)
*H04L 25/03* (2006.01)

(52) U.S. Cl.
CPC ............... *H04L 1/18* (2013.01); *H04W 52/34* (2013.01); *H04W 52/346* (2013.01)

(58) Field of Classification Search
None
See application file for complete search history.

(56) References Cited

U.S. PATENT DOCUMENTS

| 8,250,425 B2 | 8/2012 | Wong |
| 8,665,763 B2 | 3/2014 | Choi et al. |
| 8,671,322 B2 | 3/2014 | Wong |
| 9,344,227 B2 | 5/2016 | Wong |

(Continued)

FOREIGN PATENT DOCUMENTS

| CN | 101843012 A | 9/2010 |
| CN | 101855857 A | 10/2010 |

(Continued)

OTHER PUBLICATIONS

Extended European Search Report dated Feb. 20, 2019, issued in corresponding European Application No. 16836610.2, 16 pages.

(Continued)

*Primary Examiner* — Mohammed Rachedine
(74) *Attorney, Agent, or Firm* — Xsensus LLP

(57) ABSTRACT

A device includes a transmitting unit configured to transmit a first allocation signal synthesized by use of the superimposed coding to plenty of user equipment at least including a first and a second user equipment, and the first allocation signal at least including a first power signal part for the first user equipment and a second power signal part for the second user equipment; a receiving unit that receives at least a feedback retransmission request from the first and the second user equipment; and a processing unit that processes the first and the second power signal parts with a preset processing coefficient to obtain a second allocation signal in response to the retransmission request.

20 Claims, 13 Drawing Sheets

(56) References Cited

U.S. PATENT DOCUMENTS

| | | | |
|---|---|---|---|
| 2007/0250638 A1 | 10/2007 | Kiran et al. | |
| 2010/0042881 A1 | 2/2010 | Wong | |
| 2010/0265862 A1 | 10/2010 | Choi et al. | |
| 2013/0044593 A1 | 2/2013 | Wong | |
| 2014/0140286 A1* | 5/2014 | Kim | H04W 76/14 |
| | | | 370/329 |
| 2015/0171983 A1 | 6/2015 | Kusashima | |
| 2015/0263828 A1 | 9/2015 | Wong | |
| 2017/0294981 A1* | 10/2017 | Kim | H04L 1/06 |
| 2018/0183506 A1* | 6/2018 | Hessler | H04L 27/3477 |

FOREIGN PATENT DOCUMENTS

| | | |
|---|---|---|
| CN | 103297178 A | 9/2013 |
| CN | 104754719 A | 7/2015 |
| WO | 2015/029729 A1 | 3/2015 |

OTHER PUBLICATIONS

Kenichi Higuchi et al., Non-Orthogonal Multiple Access (NOMA) with Successive Interference Cancellation for Future Radio Access, IEICE Trans. Commun., vol. E98-B, No. 3, Mar. 2015, 12 pages.

Matsumoto et al., "Enhanced HARQ Technique Using Self-Interference Cancellation Coding (SICC)", Wireless Communications and Mobile Computing Conference, 2008, IWCMC '08, IEEE Aug. 6, 2008, 5 pages.

International Search Report dated Nov. 18, 2016, in PCT/CN2016/094856 filed Aug. 12, 2016.

* cited by examiner

DEVICE AND METHOD IN WIRELESS COMMUNICATION SYSTEM

This application is a continuation of U.S. patent application Ser. No. 15/743,312, filed on Jan. 10, 2018, which is a National Stage Application based on PCT/CN2016/094856, filed on Aug. 12, 2016, and claims the priority of Chinese Patent Application No. 201510501585.X, titled "DEVICE AND METHOD IN WIRELESS COMMUNICATION SYSTEM" and filed with the Chinese State Intellectual Property Office on Aug. 14, 2015, which is incorporated herein by reference in its entirety.

FIELD

The present disclosure relates to the field of wireless communication technology, and particularly relates to a device and a method in a wireless communication system for eliminating interfering signals of multiple transmissions in a wireless communication system for a multi-user superposition transmission (MUST), to effectively improve a data reception success rate and throughput of multi-stream superposition transmission.

BACKGROUND

In an existing wireless communication system in which the multi-user superposition transmission is adopted, a base station superposes data streams of different users with different transmission power being allocated based on channels of the users, a user equipment eliminates interference from other user equipment using for example a successive interference cancellation mechanism, and extracts a target data stream from the received superposed data stream. If extraction of the target data stream is failed, the user equipment may inform the base station that the target data stream is not extracted, and the base station may simply retransmit the data stream. However, if the retransmission is also superposition transmission, interference from other user equipment still exists in the retransmitted data stream. In this case, if the user equipment simply superposes the re-received data stream with the previously-received data stream to enhance the data stream, although power of the received signal is enhanced, power of the interfering signal may be also enhanced, resulting in a possibility of extracting the target data stream by retransmission is reduced.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above problems, an object of the present disclosure is to provide a device and method in a wireless communication system, which overcomes the shortcomings in the conventional technology above and can reduce interference from other users by performing predetermined processing for the retransmitted signal, thereby improving a data reception success rate and throughout of the multi-stream superposition transmission.

A device in a wireless communication system is provided in an aspect of the present disclosure, which includes: a transmitting unit configured to transmit a first allocation signal superposed using superposition coding to a plurality of user equipment comprising at least a first user equipment and a second user equipment, wherein the first allocation signal comprises at least a first power signal portion for the first user equipment and a second power signal portion for the second user equipment; a receiving unit configured to receive a retransmission request fed back from at least one of the first user equipment and the second user equipment; and a processing unit configured to process, in response to the retransmission request, the first power signal portion and the second power signal portion with predetermined processing coefficients to obtain a second allocation signal, wherein the transmitting unit is further configured to transmit the second allocation signal to the first user equipment and the second user equipment, so that the first user equipment and the second user equipment merge the first allocation signal and the second allocation signal to obtain data for the first user equipment and data for the second user equipment.

According to a preferred embodiment of the present disclosure, in the merged first allocation signal and second allocation signal, one of the first power signal portion and the second power signal portion is weakened or eliminated.

According to another preferred embodiment of the present disclosure, the processing unit is further configured to adjust a transmission power of at least one of the first power signal portion and the second power signal portion to obtain the second allocation signal.

According to another preferred embodiment of the present disclosure, the transmitting unit is further configured to transmit to the first user equipment and the second user equipment a merging indication indicating how to merge, so that the first user equipment and the second user equipment merge the first allocation signal and the second allocation signal based on the merging indication.

According to another preferred embodiment of the present disclosure, the merging indication is contained in high layer signaling or physical layer signaling.

According to another preferred embodiment of the present disclosure, the merging indication is to perform merging to enhance a higher one of the first power signal portion and the second power signal portion.

According to another preferred embodiment of the present disclosure, the merging indication is to performing merging to respectively enhance the first power signal portion for the first user equipment and the second power signal portion for the second user equipment.

According to another preferred embodiment of the present disclosure, the predetermined processing coefficients are determined based on a Hadamard matrix.

A device in a wireless communication system is further provided in another aspect of the present disclosure, which includes: a receiving unit configured to receive a first allocation signal from a base station, wherein the first allocation signal is superposed using superposition coding and comprises at least a first power signal portion for a first user equipment and a second power signal portion for a second user equipment; a processing unit configured to obtain data for the first user equipment according to the first allocation signal; and a transmitting unit configured to transmit, in a case that the processing unit fails to obtain the data for the first user equipment according to the first allocation signal, a retransmission request to the base station, wherein the receiving unit is further configured to receive a second allocation signal from the base station, the second allocation signal being obtained by processing, by the base station, the first power signal portion and the second power signal portion with predetermined processing coefficients in response to the retransmission request fed back from at least one of the first user equipment and the second user equipment, and wherein the processing unit is further configured to merge the first allocation signal and the second allocation signal to obtain the data for the first user equipment.

A device in a wireless communication system is further provided in another aspect of the present disclosure, which includes: a receiving unit configured to receive a first allocation signal, wherein the first allocation signal comprises at least a first power signal portion and a second power signal portion transmitted respectively by a first user equipment and a second user equipment on same first radio transmission resources; a processing unit configured to obtain data from the first user equipment and data from the second user equipment according to the first allocation signal; and a transmitting unit configured to transmit, in a case that the processing unit fails to obtain the data from at least one of the first user equipment and the second user equipment according to the first allocation signal, a retransmission request to the first user equipment and the second user equipment, wherein the receiving unit is further configured to receive a second allocation signal, the second allocation signal comprising at least a third power signal portion and a fourth power signal portion transmitted respectively by the first user equipment and the second user equipment on same second radio transmission resources in response to the retransmission request, the third power signal portion and the fourth power signal portion being obtained by respectively processing the first power signal portion and the second power signal portion with predetermined processing coefficients, and wherein the processing unit is further configured to merge the first allocation signal and the second allocation signal to obtain the data from the first user equipment and the data from the second user equipment.

A device in a wireless communication system is further provided in another aspect of the present disclosure, which includes: a transmitting unit configured to transmit a first power signal portion to a base station at a first transmission power on first radio transmission resources, which are the same as radio transmission resources on which a second user equipment transmits a second power signal portion; a receiving unit configured to receive a retransmission request from the base station; and a processing unit configured to process, in response to the retransmission request, the first power signal portion with a predetermined processing coefficient to obtain a third power signal portion, wherein the transmitting unit is further configured to transmit the third power signal portion to the base station at a third transmission power on second radio transmission resources, which are the same as radio transmission resources on which the second user equipment transmits a fourth power signal portion, the fourth power signal portion being obtained by processing, by the second user equipment, the second power signal portion with a predetermined processing coefficient in response to the retransmission request.

A method in a wireless communication system is further provided in another aspect of the present disclosure, which includes: a transmitting step of transmitting a first allocation signal superposed using superposition coding to a plurality of user equipment comprising at least a first user equipment and a second user equipment, wherein the first allocation signal comprises at least a first power signal portion for the first user equipment and a second power signal portion for the second user equipment; a receiving step of receiving a retransmission request fed back from at least one of the first user equipment and the second user equipment; and a processing step of processing, in response to the retransmission request, the first power signal portion and the second power signal portion with predetermined processing coefficients to obtain a second allocation signal, wherein the transmitting step further comprises transmitting the second allocation signal to the first user equipment and the second user equipment, so that the first user equipment and the second user equipment merge the first allocation signal and the second allocation signal to obtain data for the first user equipment and data for the second user equipment.

A method in a wireless communication system is further provided in another aspect of the present disclosure, which includes: a receiving step of receiving a first allocation signal from a base station, wherein the first allocation signal is superposed using superposition coding and comprises at least a first power signal portion for a first user equipment and a second power signal portion for a second user equipment; a processing step of obtaining data for the first user equipment according to the first allocation signal; and a transmitting step of transmitting, in a case that the data for the first user equipment is not obtained according to the first allocation signal, a retransmission request to the base station, wherein the receiving step further comprises receiving a second allocation signal from the base station, the second allocation signal being obtained by processing, by the base station, the first power signal portion and the second power signal portion with predetermined processing coefficients in response to the retransmission request fed back from at least one of the first user equipment and the second user equipment, and wherein the processing step further comprises merging the first allocation signal and the second allocation signal to obtain the data for the first user equipment.

A method in a wireless communication system is further provided in another aspect of the present disclosure, which includes: a receiving step of receiving a first allocation signal, wherein the first allocation signal comprises at least a first power signal portion and a second power signal portion transmitted respectively by a first user equipment and a second user equipment on same first radio transmission resources; a processing step of obtaining data from the first user equipment and data from the second user equipment according to the first allocation signal; and a transmitting step of transmitting, in a case that the data from at least one of the first user equipment and the second user equipment is not obtained according to the first allocation signal, a retransmission request to the first user equipment and the second user equipment, wherein the receiving step further comprises receiving a second allocation signal, the second allocation signal comprising at least a third power signal portion and a fourth power signal portion transmitted respectively by the first user equipment and the second user equipment on same second radio transmission resources in response to the retransmission request, the third power signal portion and the fourth power signal portion being obtained by respectively processing the first power signal portion and the second power signal portion with predetermined processing coefficients, and wherein the processing step further comprises merging the first allocation signal and the second allocation signal to obtain the data from the first user equipment and the data from the second user equipment.

A method in a wireless communication system is further provided in another aspect of the present disclosure, which includes: a transmitting step of transmitting a first power signal portion to a base station at a first transmission power on first radio transmission resources, which are the same as radio transmission resources on which a second user equipment transmits a second power signal portion; a receiving step of receiving a retransmission request from the base station; and a processing step of processing, in response to the retransmission request, the first power signal portion with a predetermined processing coefficient to obtain a third power signal portion, wherein the transmitting step further comprises transmitting the third power signal portion to the base station at a third transmission power on second radio transmission resources, which are the same as radio transmission resources on which the second user equipment transmits a fourth power signal portion, the fourth power signal portion being obtained by processing, by the second user equipment, the second power signal portion with a predetermined processing coefficient in response to the retransmission request.

An electronic device is further provided in another aspect of the present disclosure, which includes a transceiver and one or more processors. The one or more processors may be configured to execute the methods or functions of the units in the wireless communication system according to the present disclosure described above.

Computer program codes and a computer program product for implementing the methods of the present disclosure, and a computer readable storage medium, on which the computer program codes for implementing the methods of the present disclosure are recorded, are further provided in other aspects of the present disclosure.

According to the embodiments of the present disclosure, by performing predetermined processing for a retransmitted signal in multi-stream superposition to reduce interference caused by transmission with respect to other user equipment, it is possible to improve a data reception success rate and throughout of the multi-stream superposition transmission.

Other aspects of embodiments of the present disclosure are given in the following parts of the description. In which, detailed illustration is used to sufficiently disclose preferred embodiments of the embodiments of the present disclosure rather than to limit the present disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE EMBODIMENTS

Figure 1:
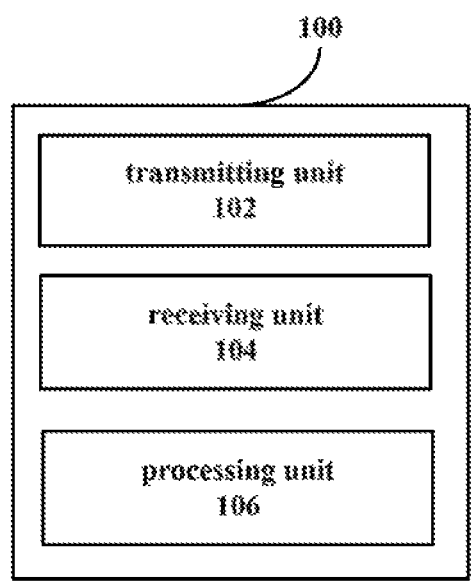
FIG. 1 is a block diagram showing a functional configuration example of a device in a wireless communication system according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

The embodiments of the present disclosure will be described in detail with reference to FIG. 1 to FIG. 14 below.

Before specifically describing the embodiments of the present disclosure, superposition coding will be briefly introduced.

By means of the superposition coding, a transmitter can communicate with multiple receivers on same transmission resources. For example, in the existing downlink multi-user superposition transmission, a base station can simultaneously transmit multiple data streams to one or more use equipment, without making distinction using different time, frequencies or multi-antenna technology. As an example, it is considered a radio transmitter Tx communicates with a first receiver Rx1 via a first physical communication link L1, and communicates with a first receiver Rx2 via a second communication link L2. Assuming a radio condition of the first receiver/link (for example, the first receiver is far away from the transmitter) is poor, and a radio condition of the second receiver/link (for example, the second receiver is close to the transmitter) is strong, which scenario may be temporary since the radio condition is constantly changing especially for a mobile station. In other words, in a case of a fixed transmission radio power, a Signal to Interference plus Noise Ratio (SINR) and a carrier to interference ratio (C/I) of the first receiver are lower (or much lower) than those of the second receiver. The transmitter Tx having known the radio conditions of the two receivers may proportionally allocate power budget between the two receivers for a particular time slot and a particular carrier frequency, so that a first data block specific to the first receiver Rx1 (the receiver in a poor radio condition) is transmitted at a higher power as compared with a second data block specific to the second receiver Rx2 (the receiver in a strong radio condition). For example, in a case that the current radio condition and extra interference caused by transmission of the second data block to the second receiver Rx2 are given, the transmitter Tx may apply sufficient power for the first data block specific to the first receiver Rx1, to allow the first receiver Rx1 to decode the data block. The transmitter Tx may then apply a power, which is smaller, but is still enough for the second receiver Rx2 to decode the second data block by using interference cancellation for eliminating or reducing interference caused by transmission of the first data block, for the second data block specific to the second receiver Rx2. The transmitter Tx then transmits the two data blocks on a same carrier frequency at the same time. Therefore, the two data blocks may be regarded as "colliding" with each other. Since the first data block is transmitted at a higher allocated power higher than the second data block, the second data block is presented as a noise or interference increment with respect to the first receiver Rx1. If a difference between the transmission powers of the two data blocks is high enough, SINR degradation at the first receiver Rx1 may be relatively small or even ignored. Therefore, if the first data block is transmitted at sufficient power in consideration of a transmission rate of the first data block, a current radio condition and extra interference caused by transmission of the second data block, the first receiver Rx1 can obtain the first data block through decoding. The second receiver Rx2 can also obtain the first data block through decoding, since the second receiver Rx2 receives the first data block under a SINR better than the SINR of the first receiver Rx1 due to the strong radio condition of the second receiver Rx2. Once the second receiver Rx2 obtains the first data block through decoding, the second receiver Rx2 regards the first data block as interference and eliminates the interference from a total signal received during a time period in which the two data blocks are received using a known interference cancellation technology. A remaining signal represents the second data block combined with a noise and interference from other sources. If the second data block is transmitted at sufficient power (which is lower than the power for the first data block) in consideration of a transmission rate of the second data block and the radio condition of the second receiver Rx2, the second receiver Rx2 can obtain the second data block through decoding.

It should be noted that the method may be extended to be applied to three or more receivers. For example, a highest power may be allocated to a receiver in the poorest radio condition for transmission, a lowest power may be allocated to a receiver in the strongest radio condition for transmission, and a middle power may be allocated to a receiver in a middle radio condition. The receiver in the strongest radio condition may obtain a data block specific to the receiver in the poorest radio condition through decoding and eliminates the decoded data block from the received signal, then obtains a data block specific to the receiver in the middle radio condition through decoding and eliminates the second decoded block, and finally obtains a data block specific to the receiver itself through decoding (the decoding/eliminating process may be referred to as successive interference cancellation). The receiver in the middle radio condition may obtain a data block specific to the receiver in the poorest radio condition through decoding and eliminates the decoded data block from the received signal, and then obtains a data block specific to the receiver itself through decoding. The receiver in the poorest radio condition may directly decode a data block specific to the receiver itself, since the data block is transmitted at the highest power. It should be understood that those skilled in the art can extend the successive interference cancellation technology to be applied to four or more receivers without extra experiments or further creative labor. The receiver may be a mobile station, for example a user equipment, and the transmitter may be a base transceiver station, for example an eNB, the data block may be for example a data package, a transport block.

With the development of the superposition coding technology, the inventor of the present disclosure recognizes retransmission issues such as hybrid automatic repeat request (HARQ) or the like when applying the superposition coding technology into an actual communication system. If a data block cannot be obtained through decoding at any receiver in the above process, the receiver may transmit a retransmission request to the transmitter. However, if the superposed data block (which cannot be obtained through decoding in the first transmission) is simply retransmitted as in the above superposition coding technology, since the interference caused by transmission of the data blocks for other receiver is also enhanced in the retransmission, the receiver still cannot obtain the data block through decoding (even if e.g. tracking and merging is performed with the data block transmitted previously), even if the transmitter retransmits the signal. The technology in the present disclosure aims to address the signal retransmission in the superposition coding transmission, and the embodiments of the present disclosure are described in detail below.

It should be understood that the superposition coding technology is briefly introduced above by taking the downlink transmission as an example, however, in uplink transmission, that is, when multiple transmitters simultaneously transmit to a single receiver on the same frequency, a similar process as above may be executed at the single receiver. In this case, the receiver may be a base transceiver station, for example an eNB, and the multiple transmitters may be mobile stations, for example user equipment.

FIG. 1 is a block diagram showing a functional configuration example of a device in a wireless communication system according to an embodiment of the present disclosure. The device may be for example included in the base station or on a base station side.

As shown in FIG. 1, a device 100 according to the embodiment may include a transmitting unit 102, a receiving unit 104 and a processing unit 106. Functional configuration examples of the above units are described in detail below.

The transmitting unit 102 may be configured to transmit a first allocation signal superposed using superposition coding to multiple user equipment including at least a first user equipment and a second user equipment. The first allocation signal may include at least a first power signal portion for the first user equipment and a second power signal portion for the second user equipment.

It should be noted that, for facilitating illustration, a case that a base station transmits a signal superposed using superposition coding to two user equipment including the first user equipment and the second user equipment is taken as an example, however, it should be understood that the base station may simultaneously transmit a signal superposed using superposition coding to three or more user equipment, and the technology in the present disclosure can also be applied thereto. The first power signal portion refers to a signal portion carrying a target data block for the first user equipment transmitted to the first user equipment at for example a first power, and the second power signal portion refers to a signal portion carrying a target data block for the second user equipment transmitted to the second user equipment at for example a second power. It can be known according to the above superposition coding technology that the first power may be greater or less than the second power according to the radio conditions of the first user equipment and the second user equipment.

The receiving unit 104 may be configured to receive a retransmission request fed back from at least one of the first user equipment and the second user equipment. In a case that at least one of the first user equipment and the second user equipment fails to decode data corresponding thereto based on the first allocation signal, the at least one of the first user equipment and the second user equipment may transmit a retransmission request to the base station to request signal retransmission.

The processing unit 106 may be configured to process, in response to the retransmission request, the first power signal portion and the second power signal portion with predetermined processing coefficients to obtain a second allocation signal.

Then, the transmitting unit 102 may be further configured to transmit the second allocation signal to the first user equipment and the second user equipment, so that the first user equipment and the second user equipment merge the first allocation signal and the second allocation signal to obtain data for the first user equipment and data for the second user equipment.

It should be understood that although it is described here the base station simultaneously transmits a retransmitted signal to both the first user equipment and the second user equipment in the retransmission, the present disclosure also intends to give an example that the base station transmits a signal to only the user equipment which transmits the retransmission request. However, for the convenience of description, a case that the base station transmits the retransmitted signal to all user equipment upon receiving the retransmission request is taken as an example for description, and a case that the base station transmits a signal to only the user equipment which transmits the retransmission request is regarded as a special case that a power signal portion for the user equipment which does not transmit the retransmission request is set to 0 in the retransmitted signal, which will not be separately described here.

Actually, data decoding of different user equipment is associated with one another in the multi-user superposition transmission, thus if data decoding of one user equipment is failed in the first transmission, it is likely that other user equipment also fail to decode the data and transmit a retransmission request. Compared with respectively performing retransmission to the first user equipment and the second user equipment on different transmission resources as in a general approach, in an example of the present disclosure, when performing the retransmission, specific processing is performed and the superposition coding is still adopted to simultaneously perform retransmission to the first user equipment and the second user equipment on the same transmission resources, thereby significantly improving utilization efficiency of the resources and ensuring a success rate of retransmission to some extent. Such performance gain is more apparent in a case that more user equipment participate in superposition transmission.

Preferably, in order to reduce interference caused by transmission with respect to other user equipment, in the merged first allocation signal and second allocation signal, one of the first power signal portion and the second power signal portion is weakened or eliminated.

Figure 15:
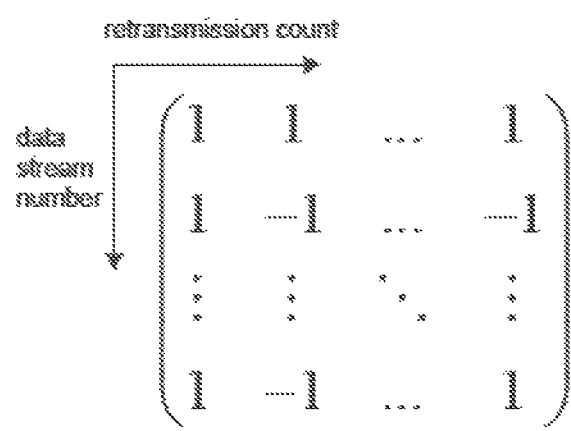
FIG. 15 is a diagram of a layer-time code matrix.

In order to weaken or eliminate interference in the merged signal, the device 100 adjusts, before performing retransmission using the superposition coding, an interaction relation between the signal portion for the first user equipment and the signal portion for the second user equipment on the same transmission resources. For example, if the signal portion for the first user equipment and the signal portion for the second user equipment are added to be transmitted on the same transmission resources in a previous transmission, the device 100 performs subtraction between the signal portion for the first user equipment and the signal portion for the second user equipment and then transmits the signal after subtraction on the same retransmission resources in retransmission. In this case, at the receiving user equipment end, the signal portion for other user equipment as interference may be weakened simply by merging the received signals in the two transmissions. In other words, one of the first power signal portion and the second power signal portion is multiplied by a processing coefficient of −1 in the retransmission, and the other of the first power signal portion and the second power signal portion remains unchanged or is multiplied by a processing coefficient of 1. Preferably, the predetermined processing coefficients may be determined based on a Hadamard matrix. As an example, the predetermined processing coefficients may be referred to as "a layer-time code matrix" hereinafter, a horizontal dimension of the matrix represents a maximum retransmission count, and a vertical dimension of the matrix represents the number of data streams (corresponding to the number of the user equipment). The layer-time code matrix may be represented as for example as shown in FIG. 15:

In the described example, assuming a base station transmits two data blocks $b_F$ and $b_N$ to the first user equipment and the second user equipment respectively, and modulated symbol strings corresponding to the two data blocks may be represented as $d_F$ and $d_N$. Assuming the first user equipment is in a poor radio channel (for example, far away from the base station), and the second user equipment is in a strong radio channel (for example, close to the base station). A layer-time code matrix used by the base station is a Hadamard matrix A of 2×(R+1) (where R+1 represents a maximum transmission count), which can be obtained by repeating a Walsh matrix of 2×2.

$$A = \begin{pmatrix} 1 & 1 & \ldots & 1 & 1 \\ 1 & -1 & \ldots & 1 & -1 \end{pmatrix}$$

where a first row of the matrix includes predetermined coefficients for the first user equipment in respective times of retransmissions, and a second row of the matrix includes predetermined coefficients for the second user equipment in respective times of retransmissions. Assuming a downlink channel between the base station and the first user equipment and a downlink channel between the base station and the second user equipment are respectively represented as $h_{F,0}$ and $h_{N,0}$ in a first transmission. The base station allocates a transmission power $p_{F,0}$ and a transmission power $p_{N,0}$ for data block transmission to the two user equipment based on attenuation conditions of $h_{F,0}$ and $h_{N,0}$, $p_{F,0} > p_{N,0}$. In the first transmission, the retransmission count is 0, and the base station respectively weights $d_F$ and $d_N$ with coefficients A(0,0)=1 and A(1,0)=1 in a zero column in the layer-time code matrix, and superposes the weighted results to obtain a baseband signal string $x_0$ to be transmitted (that is, the above first allocation signal).

where $x_0 = \sqrt{p_{F,0}} A(0,0) d_F + \sqrt{p_{N,0}} A(1,0) d_N = \sqrt{p_{F,0}} d_F + \sqrt{p_{N,0}} d_N$ ($\sqrt{p_{F,0}} d_F$ is the first power signal portion, and $\sqrt{p_{N,0}} d_N$ is the second power signal portion).

A signal received by the first user equipment in the first transmission may be represented as:

$$y_{F,0} = h_{F,0} (\sqrt{p_{F,0}} d_F + \sqrt{p_{N,0}} d_N) + n_{F,0}$$

where $n_{F,0}$ is additive noise received by the first user equipment in the first transmission.

A signal received by the second user equipment in the first transmission may be represented as:

$$y_{N,0} = h_{N,0} (\sqrt{p_{F,0}} d_F + \sqrt{p_{N,0}} d_N) + n_{N,0}$$

where $n_{N,0}$ is additive noise received by the second user equipment in the first transmission.

The first user equipment regards the second power signal portion $\sqrt{p_{N,0}} d_N$ as a part of the noise upon receiving $x_0$, and performs demodulation and self-checking (for example, using cyclic redundant check, CRC) for $y_{F,0}$ based on $h_{F,0}$ and $p_{F,0}$. The second user equipment performs demodulation and self-checking for $y_{N,0}$ based on $h_{N,0}$ and $p_{F,0}$ upon receiving $x_0$ to obtain $b_F$, recoveries an interference signal $h_{N,0}\sqrt{p_{F,0}} d_F$ based on $b_F$, and then eliminates the interference signal $h_{N,0}\sqrt{p_{F,0}} d_F$ from $y_{N,0}$, and performs demodulation and self-checking using $y_{N,0} - h_{N,0}\sqrt{p_{F,0}} d_F$ based on $h_{N,0}$ and $p_{N,0}$.

If the first user equipment and the second user equipment determine that the data blocks are correctly received by self-checking, the first user equipment and the second user equipment inform the base station to transmit next data blocks, for example, the first user equipment and the second user equipment transmit acknowledgement (ACK) information of 1 bit to the base station via the uplink channels thereof. The base station waits for the acknowledgement information for the transmitted data blocks from the user equipment after transmitting the data blocks, and transmits next data blocks upon receiving the acknowledgement information.

However, if one of the first user equipment and the second user equipment determines that the data block is not correctly received by self-checking, the user equipment may inform the base station to retransmit the data block. For example, the first user equipment and/or the second user equipment transmit negative acknowledgement (NACK) information of 1 bit to the base station via the uplink channels thereof as a retransmission request. Upon receiving the retransmission request, optionally, the base station reallocates transmission powers $p_{F,1}$ and $p_{N,1}$ to data blocks of the two user equipment based on attenuation conditions of the downlink channels $h_{F,1}$ and $h_{N,1}$ (in order to reduce system overhead or simplify calculation complexity, the base station may re-use the transmission powers allocated for the previous transmission, that is, $p_{F,1} = p_{F,0}$, $p_{N,1} = p_{N,0}$), $p_{F,1} > p_{N,1}$. The retransmitted $d_F$ and $d_N$ are weighted with predetermined processing coefficients (that is, coefficients A(0,1)=1 and A(1,1)=−1 in a first column in the layer-time code matrix), and the weighted results are superposed to obtain a baseband signal string $x_1$ to be transmitted (that is, the second allocation signal above), where $$x_1 = \sqrt{p_{F,1}} A(0,1) d_F + \sqrt{p_{N,1}} A(1,1) d_N = \sqrt{p_{F,1}} d_F - \sqrt{p_{N,1}} d_N$$

It should be understood that in the above example, the device 100 may for example generate a complete layer-time code matrix in advance, in which, each of the rows corresponds to each of data streams of all user equipment, and each of the columns corresponds to each of the retransmission counts. For a retransmission count, predetermined coefficients in a corresponding column are acquired to conveniently process the data streams of the user equipment. In an optional example, the device 100 may generate a coefficient based on a current retransmission count and user equipment involved in the retransmission in a real-time manner for processing.

A signal received by the first user equipment in a first retransmission (a second transmission) may be represented as:

$$y_{F,1} = h_{F,1} (\sqrt{p_{F,1}} d_F - \sqrt{p_{N,1}} d_N) + n_{F,1}$$

where $h_{F,1}$ denotes a channel of the first user equipment in the first retransmission, and $n_{F,1}$ denotes additive noise for the first user equipment in the first retransmission.

A signal received by the second user equipment in the first retransmission may be represented as:

$$y_{N,1} = h_{N,1} (\sqrt{p_{F,1}} d_F - \sqrt{p_{N,1}} d_N) + n_{N,1}$$

where $h_{N,1}$ denotes a channel of the second user equipment in the first retransmission, and $n_{N,1}$ denotes additive noise for the second user equipment in the first retransmission.

In a schematic simplified example, a time interval between the retransmission and the previous transmission is very small, changes in the channel between the base station and the first user equipment and the channel between the base station and the second user equipment may be ignored, and transmission powers used in the two transmissions remain unchanged (that is, $h_{F,1} = h_{F,0}$, $h_{N,1} = h_{N,0}$, $p_{F,1} = p_{F,0}$, $p_{N,1} = p_{N,0}$). The first user equipment performs positive merging based on $y_{F,0}$ and $y_{F,1}$ received respectively in the two downlink data transmissions, and a signal obtained by the positive merging is represented as:

$$y_F = y_{F,0} + y_{F,1}$$

In the merged signal, the signal portion for the second user equipment is eliminated, and the signal portion for the first user equipment is enhanced, therefore, the first user equipment can obtain its target data block through decoding.

On the other hand, the second user equipment performs negative merging based on $y_{N,0}$ and $y_{N,1}$ received respectively in the two downlink data transmissions, and a signal obtained by the negative merging is represented as:

$$y_N = y_{N,0} - y_{N,1}$$

In the merged signal, the signal portion for the first user equipment is eliminated, and the signal portion for the second user equipment is enhanced, therefore, the second user equipment can obtain its target data block through decoding.

As an optional embodiment, in a case that the channel conditions and transmission powers change significantly in the two transmissions, the first user equipment performs positive merging based on $y_{F,0}$ and $y_{F,1}$ received respectively in the two downlink data transmissions as follows, and a signal obtained by the positive merging is represented as:

$$y_F = \sqrt{p_{F,1}} \, |h_{F,1}|^2 h_{F,0}^* y_{F,0} + \sqrt{p_{F,0}} \, |h_{F,0}|^2 h_{F,1}^* y_{F,1}$$
$$= 2\sqrt{p_{F,0}p_{F,1}} \, |h_{F,0}|^2 |h_{F,1}|^2 d_F + |h_{F,0}|^2 |h_{F,1}|^2$$
$$\left(\sqrt{P_{F,1}p_{N,0}} - \sqrt{p_{F,0}p_{N,1}}\right)d_N + \sqrt{p_{F,1}} \, |h_{F,1}|^2 h_{F,0}^* n_{F,0} +$$
$$\sqrt{p_{F,0}} \, |h_{F,0}|^2 h_{F,1}^* n_{F,1}$$

It can be seen from $y_F$ that the positive merging is performed with $y_{F,0}$ and $y_{F,1}$ being multiplied by particular parameters respectively, and the particular parameters are used to enhance $d_F$ and weaken $d_N$ using mathematical approaches in a case that the channel conditions and the powers are changed. It should be understood that those skilled in the art may also design other particular parameters according to the ideas of the present disclosure to preprocess $y_{F,0}$ and $y_{F,1}$ before merging for realizing the same purpose, for example, removing a part related to the power in the above equation, which will not be enumerated here in the present disclosure. Then, the first user equipment performs demodulation and self-checking for $y_F$ to obtain the target data stream $b_F$.

On the other hand, similarly, the second user equipment performs negative merging based on $y_{N,0}$ and $y_{N,1}$, and a signal obtained by the negative merging is represented as:

$$y'_N = \sqrt{p_{N,1}} \, |h_{N,1}|^2 h_{N,0}^* y_{N,0} - \sqrt{p_{N,0}} \, |h_{N,0}|^2 h_{N,1}^* y_{N,1}$$
$$= 2\sqrt{p_{N,0}p_{N,1}} \, |h_{N,0}|^2 |h_{N,1}|^2 d_N + |h_{N,0}|^2 |h_{N,1}|^2$$
$$\left(\sqrt{P_{N,1}p_{F,0}} - \sqrt{p_{N,0}p_{F,1}}\right)d_F + \sqrt{p_{N,1}} \, |h_{N,1}|^2 h_{N,0}^* n_{N,0} +$$
$$\sqrt{p_{N,0}} \, |h_{N,0}|^2 h_{N,1}^* n_{N,1}$$

It can be seen from $y'_N$ that $d_N$ is enhanced while interference power $d_F$ is weakened. The second user equipment performs demodulation and self-checking for $y'_N$ to try to obtain the target data stream $b_N$.

If the second user equipment cannot obtain the target data stream $b_N$, the positive merging may be performed based on $y_{N,0}$ and $y_{N,1}$, and a signal obtained by the positive merging is represented as:

$$y''_N = \sqrt{p_{F,1}} \, |h_{N,1}|^2 h_{N,0}^* y_{N,0} + \sqrt{p_{F,0}} \, |h_{N,0}|^2 h_{N,1}^* y_{N,1}$$
$$= 2\sqrt{p_{F,0}p_{F,1}} \, |h_{N,0}|^2 |h_{N,1}|^2 d_F + |h_{N,0}|^2 |h_{N,1}|^2$$
$$\left(\sqrt{P_{F,1}p_{N,0}} - \sqrt{p_{F,0}p_{N,1}}\right)d_N + \sqrt{p_{F,1}} \, |h_{N,1}|^2 h_{N,0}^* n_{N,0} +$$
$$\sqrt{p_{F,0}} \, |h_{N,0}|^2 h_{N,1}^* n_{N,1}$$

It can be seen from $y''_N$ that $d_F$ is enhanced while interference power of $d_N$ is weakened. The second user equipment performs demodulation and self-checking for $y''_N$ to obtain $b_F$, removes an interference signal $|h_{N,0}|^2|h_{N,1}|^2$ ($\sqrt{P_{N,1}P_{F,0}}-\sqrt{P_{N,0}P_{F,1}})d_F$ from $y'_N$, and performs demodulation and self-checking for $d_N$ to obtain $b_N$. Optionally, the second user equipment may also firstly perform positive merging to obtain $y'_N$ and obtain $b_N$ through decoding with the above method, and in a case of failing to obtain $b_N$ through decoding, the second user equipment then performs negative merging to obtain $y'_N$ and obtains $b_N$ through decoding.

As another embodiment, the base station informs not only the allocated power for $d_F$ but also the allocated power for a signal portion $d_N$ of the second user equipment to the first user equipment. The first user equipment performs merging based on $y_{F,0}$ and $y_{F,0}$ and $y_{F,1}$ for eliminating interference $d_N$ and enhancing $d_F$.

$$y_F = \sqrt{p_{N,1}} \, |h_{F,1}|^2 h_{F,0}^* y_{F,0} + \sqrt{p_{N,0}} \, |h_{F,0}|^2 h_{F,1}^* y_{F,1}$$
$$= \left(\sqrt{p_{N,1}p_{F,0}} + \sqrt{p_{N,0}p_{F,1}}\right)|h_{F,0}|^2|h_{F,1}|^2 d_F +$$
$$\sqrt{p_{N,1}} \, |h_{F,1}|^2 h_{F,0}^* n_{F,0} + \sqrt{p_{N,0}} \, |h_{F,0}|^2 h_{F,1}^* n_{F,1}$$

It can be seen from $y_F$ that $d_F$ is enhanced while interference $d_N$ is eliminated. The first user equipment then performs demodulation and self-checking for $y_F$ to obtain the target data stream $b_F$.

Similarly, the second user equipment performs negative merging based on $y_{N,0}$ and $y_{N,1}$ for eliminating interference $d_F$ and enhancing $d_N$:

$$y'_N = \sqrt{p_{F,1}} \, |h_{N,1}|^2 h_{N,0}^* y_{N,0} - \sqrt{p_{F,0}} \, |h_{N,0}|^2 h_{N,1}^* y_{N,1}$$
$$= \left(\sqrt{p_{F,1}p_{N,0}} + \sqrt{p_{F,0}p_{N,1}}\right)|h_{N,0}|^2|h_{N,1}|^2 d_N +$$
$$\sqrt{p_{F,1}} \, |h_{N,1}|^2 h_{N,0}^* n_{N,0} + \sqrt{p_{F,0}} \, |h_{N,0}|^2 h_{N,1}^* n_{N,1}$$

It can be seen from $y_N'$ that $d_N$ is enhanced while interference power of $d_F$ is eliminated. The second user equipment performs demodulation and self-checking for $y_N'$, to try to obtain the target data stream $b_N$.

If the second user equipment fails to obtain the target data stream $b_N$, the second user equipment performs positive merging based on $y_{N,0}$ and $y_{N,1}$ for eliminating interference $d_N$ and enhancing $d_F$, and a signal obtained through the positive merging is represented as:

$$y''_N = \sqrt{p_{N,1}} \, |h_{N,1}|^2 h_{N,0}^* y_{N,0} + \sqrt{p_{N,0}} \, |h_{N,0}|^2 h_{N,1}^* y_{N,1}$$

-continued $$= \left(\sqrt{p_{N,1}p_{F,0}} + \sqrt{p_{N,0}p_{F,1}}\right)|h_{N,0}|^2|h_{N,1}|^2 d_F +$$
$$\sqrt{p_{N,1}} |h_{N,1}|^2 h_{N,0}^* n_{N,0} + \sqrt{p_{N,0}} |h_{N,0}|^2 h_{N,1}^* n_{N,1}$$

It can be seen from $y_N'$ that $d_F$ is enhanced while interference $d_N$ is eliminated. The second user equipment then performs negative merging based on $y_{N,0}$ and $y_{N,1}$, and a signal obtained through the negative merging is represented as:

$$y_N''' = \sqrt{p_{N,1}} |h_{N,1}|^2 h_{N,0}^* y_{N,0} - \sqrt{p_{N,0}} |h_{N,0}|^2 h_{N,1}^* y_{N,1}$$
$$= 2\sqrt{p_{N,0}p_{N,1}} |h_{N,0}|^2 |h_{N,1}|^2 d_N + |h_{N,0}|^2 |h_{N,1}|^2$$
$$\left(\sqrt{P_{N,1}P_{F,0}} - \sqrt{p_{N,0}p_{F,1}}\right) d_F + \sqrt{p_{N,1}} |h_{N,1}|^2 h_{N,0}^* n_{N,0} +$$
$$\sqrt{p_{N,0}} |h_{N,0}|^2 h_{N,1}^* n_{N,1}$$

The second user equipment then performs demodulation and self-checking for $y_N''$ to obtain $b_F$, and removes an interference signal $|h_{N,0}|^2|h_{N,1}|^2(\sqrt{p_{N,1}p_{F,0}}-\sqrt{p_{N,0}p_{F,1}})d_F$ from $y_N'''$, and obtains performs demodulation and self-checking for $d_N$.

In demodulating the data signal, in an example, the transmission powers $p_F$ and $p_N$ are known to the first user equipment and the second user equipment, for example, the base station indicates the transmission powers $p_F$ and $p_N$ to the first user equipment and the second user equipment through control signaling. In this case, the user equipment may estimate channels $h_F$ and $h_N$ based on for example a cell-specific reference signal (CRS) or a channel status indicator-reference signal (CSI-RS), thereby obtaining the data $b_F$ and $b_N$ through decoding.

On the other hand, after the first transmission, if the first user equipment fails to correctly receive data while the second user equipment correctly receives data, as an embodiment, the base station only transmits a data block for the first user equipment with a predetermined coefficient (for example, $p_{N,1}$ is set to be 0) for the next time. The first user equipment may perform, in a case that attempting to obtain the data through separately demodulating the retransmitted signal fails, positive merging for the signals received in the two transmissions based on a corresponding layer-time code [A(0,0), A(0,1)]. Since the signal portion for the first user equipment is enhanced in the merged signal, a possibility that the first user equipment obtains its data through decoding is improved greatly. As a matter of course, in this case, the base station may also simultaneously transmit a data block for the first user equipment and a data block for the second user equipment as described above, and an interfering signal portion is eliminated in the merging manner described above.

On the other hand, after the first transmission, if the second user equipment fails to correctly receive the data while the first user equipment correctly receives the data, as an embodiment, the base station may only transmit a data block for the second user equipment with a predetermined coefficient for the next time. The second user equipment may perform, in a case that attempting to obtain the data through separately demodulating the retransmitted signal fails, negative merging for the signals received in the two transmissions based on a corresponding layer-time code [A(1,0), A(1,1)]. Since the signal portion for the second user equipment is enhanced in the merged signal, a possibility that the second user equipment obtains its data through decoding is improved greatly. As a matter of course, in this case, the base station may also simultaneously transmit a data block for the first user equipment and a data block for the second user equipment as described above, and an interfering signal portion is eliminated in the merging manner described above. In other words, in a case that only one of the first user equipment and the second user equipment fails to correctly receive the data block, the base station may also simultaneously transmit the data block for the first user equipment and the data block for the second user equipment in the manner described above, and the interfering signal portion is eliminated in the merging manner described above.

It should be noted in a case that the data block for the user equipment which fails to obtain the data through demodulating is transmitted separately in the retransmission, the user equipment may adopt multiple merging decoding schemes in addition to the above examples. For example, in the previous paragraph, the second user equipment may also perform positive merging for the signals received in the two transmissions to eliminate $d_N$, and derives target data $d_N$ after obtaining $d_F$ through decoding. Alternatively, the decoding schemes may be combined in a specific order and then are executed successively, which are not enumerated here for conciseness.

The above retransmission process may be repeated until a maximum retransmission count of user data is reached. If the data demodulation still fails in this case, unsuccessful transmission is announced and the transmission is abandoned. The data retransmission count may be limited in for example high layer configuration of the base station, and is indicated to the user equipment through signaling. For example, a maximum retransmission count maxHARQ-Tx configured through radio resource control (RRC) may be applied in the present disclosure.

It should be noted that although a matrix element of the layer-time code matrix determined based on a Hadamard matrix is 1 or −1 in the above described example, the matrix element may be other elements than 1 or −1, as long as one of the first power signal portion and the second power signal portion is weakened or eliminated in the merged signal.

In addition, it should also be noted that although positive additive merging or negative subtractive merging is performed at the first user equipment and the second user equipment respectively in the above described example, the positive additive merging or the negative subtractive merging is performed at both the first user equipment and the second user equipment, thus data corresponding to one of the first power signal portion and the second power signal portion may be obtained through decoding, and then data corresponding to the other power signal portion may be derived accordingly.

That is, the exemplary calculation process described above is merely an example rather than limitation, and those skilled in the art may adjust the above calculation process according to principles of the present disclosure, and such adjustment is considered to fall within the scope of the present disclosure.

In addition, it should be understood that in addition to or instead of processing the first power signal portion and the second power signal portion with predetermined processing coefficients, the processing unit 106 may be further configured to adjust, in response to the retransmission request, a transmission power of at least one of the first power signal portion and the second power signal portion to obtain a second allocation signal.

Specifically, if the transmission power of the first power signal portion is greater than the transmission power of the second power signal portion, in a case that data reception of at least one of the first user equipment and the second user equipment fails, the processing unit 106 may further increase the transmission power of the first power signal portion and accordingly reduce the transmission power of the second power signal portion in the retransmission. Thus, the first user equipment and the second user equipment may firstly obtain data corresponding to the first power signal portion through decoding based on the merged first allocation signal and second allocation signal, and then derive data corresponding to the second power signal portion through non-linear interference cancellation such as successive interference cancellation.

Preferably, in order to make the first user equipment and the second user equipment respectively perform corresponding merging (for example, an addition operation or a subtraction operation) for the first allocation signal and the second allocation signal described above so as to eliminate interference to the greatest extent and reduce calculation load, the transmitting unit 102 may be further configured to transmit merging indications indicating how to perform merging to the first user equipment and the second user equipment, so that the first user equipment and the second user equipment merge the first allocation signal and the second allocation signal according to the merging indications. Preferably, the transmitting unit 102 may notify the user equipment of the merging indications by including the merging indications in high-layer signaling (for example, RRC signaling, MAC layer signaling or the like). The merging indication may include the above layer-time code matrix and/or a row number corresponding to the user equipment. In an example in which the predetermined processing coefficients are generated at the base station side in a real-time manner, the predetermined processing coefficients, the additive merging, the subtractive merging and the like with respect to the current transmission base station may be notified to the first user equipment and the second user equipment through physical layer signaling (for example, downlink control information DCI). If the merging indication is contained in the physical layer signaling, the physical layer signaling may be transmitted through physical downlink control channel (PDCCH), and time variation is better in this case.

The most possible application scenario of the multi-user superposition coding may be that only one far user equipment and one near user equipment share transmission resources. Therefore, in an optional example, knowledge about a layer-time code matrix is for example known in advance on the base station side and the user equipment side. In the layer-time code matrix, a first row fixedly corresponds to retransmission processing coefficients of the far user equipment, and a second row fixedly corresponds to retransmission processing coefficients of the near user equipment. In this example, the layer-time code matrix is stored in advance in a memory of the user equipment, and the user equipment may determine whether the user equipment itself is the far user equipment or the near user equipment based on for example transmission powers for the two user equipment indicated by the base station (power of the far user equipment is large, and power of the near user equipment is small), and further reads predetermined coefficients in the layer-time code matrix for the merging operation.

Preferably, the merging indication may be to perform merging to enhance a higher one of the first power signal portion and the second power signal portion. As described above, for the first power signal portion $\sqrt{p_{F,0}}d_F$ and the second power signal portion $\sqrt{p_{N,0}}d_N$, if the first power signal portion is greater than the second power signal portion, the merging indication may be to perform additive merging for the first allocation signal $\sqrt{p_{F,0}}d_F + \sqrt{p_{N,0}}d_N$ and the second allocation signal $\sqrt{p_{F,1}}d_F - \sqrt{p_{N,1}}d_N$ at both the first user equipment and the second user equipment to enhance the first power signal portion, so that data corresponding to the first power signal portion is obtained first through decoding at both the first user equipment and the second user equipment, and data corresponding to the second power signal portion is derived through for example successive interference cancellation. Otherwise, if the first power signal portion is less than the second power signal portion, the merging indication may be to perform subtractive merging for the first allocation signal $\sqrt{p_{F,0}}d_F + \sqrt{p_{N,0}}d_N$ and the second allocation signal $\sqrt{p_{F,1}}d_F - \sqrt{p_{N,1}}d_N$ at both the first user equipment and the second user equipment to enhance the second power signal portion, so that data corresponding to the second power signal portion is obtained first through decoding at both the first user equipment and the second user equipment, and data corresponding to the first power signal portion is derived through for example successive interference cancellation.

In addition, preferably, the merging indication may be to perform merging to respectively enhance the first power signal portion for the first user equipment and the second power signal portion for the second user equipment. That is, the base station may indicate the first user equipment and the second user equipment to perform merging to enhance a power signal portion corresponding to its own target data block.

It should be understood that the merging indication may be optional. That is, the base station may not transmit the merging indication to the user equipment, and the user equipment may perform default merging (for example, additive merging) based on a normal case. If data cannot be obtained through decoding based on the default merging, the subtractive merging may be performed. In other words, the user equipment may also determine how to perform merging itself, thereby reducing signaling overhead.

It can be understood that although an exemplary processing in which the retransmitted signal is processed to weaken or eliminate the first power signal portion or the second power signal portion in the merged first-transmitted signal and retransmitted signal is given above, the exemplary processing is merely an example rather than limitation, and those skilled in the art may modify the above process according to the principles of the present disclosure.

Figure 2:
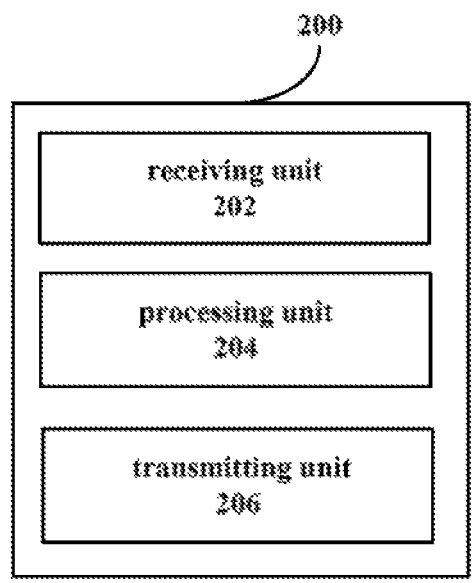
FIG. 2 is a block diagram showing a functional configuration example of a device in a wireless communication system according to another embodiment of the present disclosure.

A functional configuration example of a device on a base station side is described above with reference to FIG. 1. Next, a functional configuration example of a device on a user equipment side in a wireless communication system according to another embodiment of the present disclosure is described with reference to FIG. 2. FIG. 2 is a block diagram showing a functional configuration example of a device on a user equipment side in a wireless communication system according to another embodiment of the present disclosure. The device may be located in the user equipment or on a user equipment side.

As shown in FIG. 2, a device 200 according to the embodiment may include a receiving unit 202, a processing unit 204 and a transmitting unit 206. Functional configuration examples of the units are described in detail below.

The receiving unit 202 may be configured to receive a first allocation signal from a base station. The first allocation signal is superposed through superposition coding, and includes at least a first power signal portion for a first user equipment and a second power signal portion for a second user equipment.

The processing unit 204 may be configured to obtain data for the first user equipment based on the first allocation signal. For example, the processing unit 204 may obtain data for the first user equipment based on the first allocation signal through interference cancellation, demodulation and self-checking and the like.

Due to the existence of interference and the like, the processing unit 204 may not correctly obtain data through decoding based on the first allocation signal. In this case, the transmitting unit 206 may be configured to transmit, in a case that the processing unit 204 fails to obtain data for the first user equipment based on the first allocation signal, a retransmission request to the base station, so that the base station may transmit a second allocation signal to the first user equipment.

The receiving unit 202 may be further configured to receive the second allocation signal from the base station. The second allocation signal is obtained by processing, by the base station, the first power signal portion and the second power signal portion with predetermined processing coefficients in response to the retransmission request fed back from at least one of the first user equipment and the second user equipment. A specific process of obtaining the second allocation signal may be referred to the foregoing description at corresponding positions, and is not repeated here anymore.

The processing unit 204 may be further configured to merge the first allocation signal and the second allocation signal to weaken or eliminate one of the first power signal portion and the second power signal portion in the merged signal, thereby obtaining data for the first user equipment.

As described above, the processing unit 204 may perform merging to weaken or eliminate the second power signal portion so as to directly obtain data corresponding to the first power signal portion through decoding. Alternatively, the processing unit 204 may perform merging to first obtain the higher power signal portion (for example, the second power signal portion) through decoding, and then indirectly obtain data corresponding to the first power signal portion through non-linear interference cancellation for example successive interference cancellation based on a result of the merging.

Preferably, the processing unit 204 may be further configured to merge the first allocation signal and the second allocation signal to enhance a higher one of the first power signal portion and the second power signal portion, obtain data corresponding to the higher power signal portion through decoding, and then derive data corresponding to a lower power signal portion through non-linear interference cancellation for example successive interference cancellation.

Alternatively, as a preferred example, the processing unit 204 may be further configured to merge the first allocation signal and the second allocation signal to enhance the first power signal portion for the first user equipment. Similarly, the similar processing may also be executed at the second user equipment. That is, the processing unit 204 of the user equipment may determine how to perform merging to enhance a power signal portion corresponding to a target data block of the user equipment, so as to directly obtain the desired target data.

Preferably, in order that each user equipment can perform merging to obtain its own data through decoding, the receiving unit 206 may further receive a merging indication from the base station, so that the processing unit 204 may further perform merging (for example, additive merging or subtractive merging) on the first allocation signal and the second allocation based on the merging indication. The merging indication may be for example contained in high-layer signaling (for example, RRC signaling, MAC layer signaling and the like) or a physical-layer signaling (for example, DCI). Preferably, as described above, the merging indication may be not necessarily different for respective user equipment, and the merging indication may also be to perform merging to enhance a higher one of the first power signal portion and the second power signal portion or to enhance a power signal portion corresponding to a target data block of respective user equipment.

When decoding a data signal, in a case that a transmission power is known by the user equipment, the processing unit 204 may be further configured to estimate a channel status (h0 described above) based on CRS or CSI-RS from the base station, and obtain data through decoding based on the transmission power and the channel status.

It should be noted that, the device on the user equipment side described with reference to FIG. 2 corresponds to the device on the base station side described with reference to FIG. 1, thus contents not described in detail here may be referred to foregoing description at corresponding positions and are not described repeatedly here. Next, a signaling interaction flow for downlink transmission according to an embodiment of the present disclosure is described in conjunction with the devices on the base station side and on the user equipment side described above.

Figure 3:
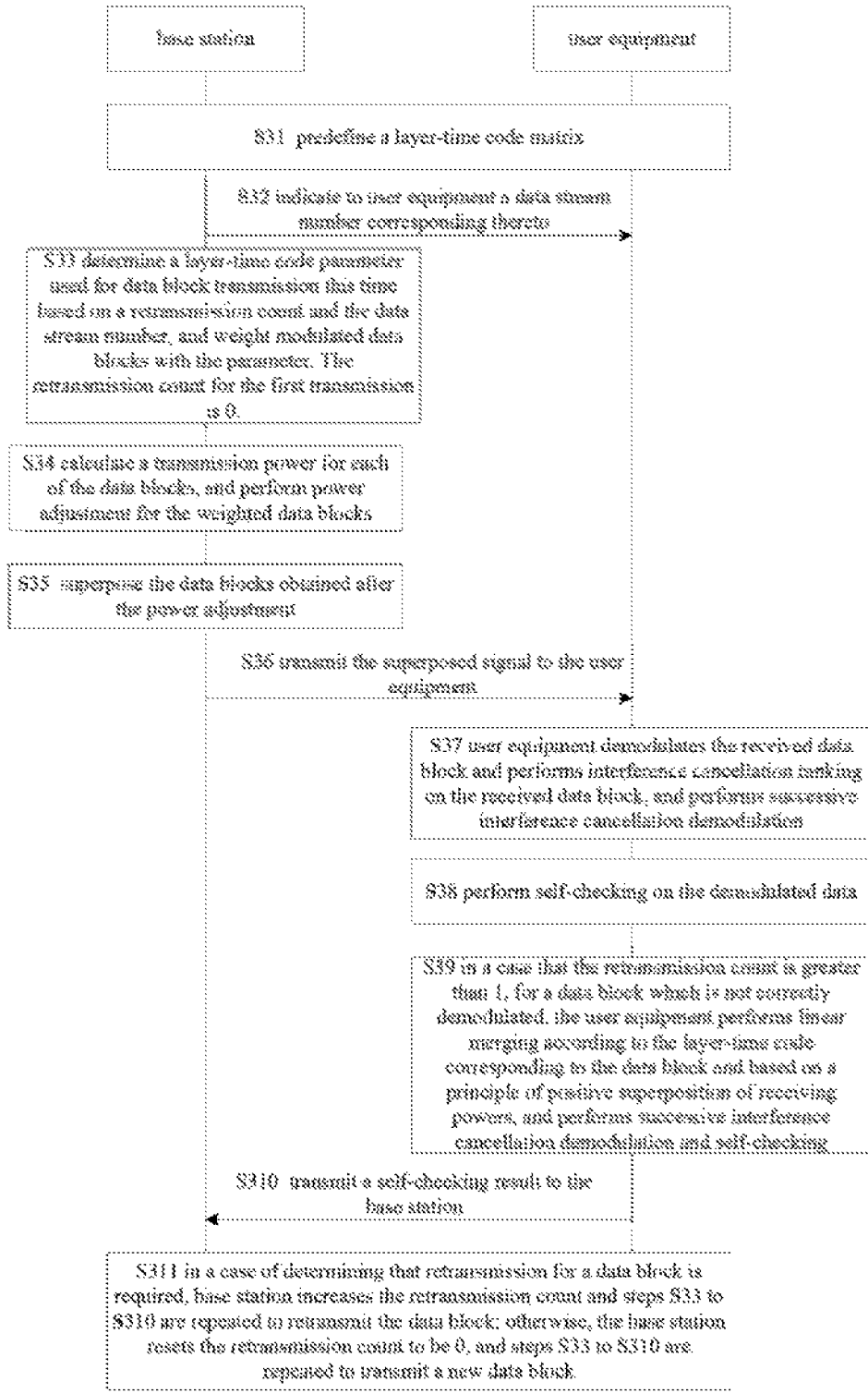
FIG. 3 is a flow diagram showing an example of a signaling interaction process for downlink transmission according to an embodiment of the present disclosure.

FIG. 3 is a flow diagram showing an example of a signaling interaction process for downlink transmission according to an embodiment of the present disclosure.

As shown in FIG. 3, in step S31, a base station predefines a layer-time code matrix based on the number of data streams and the maximum retransmission count. In step S32, the base station indicates to a user equipment a data stream number corresponding thereto. In step S33, the base station determines a layer-time code parameter for data block transmission this time based on a retransmission count and the data stream number, and weights modulated data blocks with the parameter. For the first transmission, the retransmission count may be defined to be 0. In step S34, the base station calculates transmission powers of the respective data blocks, and performs power adjustment for the weighted data blocks. In step S35, the base station superposes the data blocks obtained after the power adjustment. In step S36, the base station transmits the superposed signal to the user equipment. Upon receiving the superposed signal, the user equipment demodulates the received data block, performs interference cancellation ranking on the received data block and performs successive interference cancellation demodulation in step S37, and performs CRC self-checking on data obtained through demodulation in step S38. In step S39, in a case that the retransmission count is greater than 1, for a data block which is not correctly obtained by demodulating, the user equipment performs linear merging according to the layer-time code corresponding to the data block and based on a principle of positive superposition of receiving powers, and performs successive interference cancellation demodulation and self-checking, and then transmits a self-checking result to the base station in step S310. In step S311, in a case of determining retransmission for a data block is required, the base station increases the retransmission count, and steps S33 to S310 are repeated to retransmit the data block; otherwise, the base station resets the retransmission count to be 0, and steps S33 to S310 are repeated to transmit a new data block.

It should be noted that the above signaling interaction process may be merely an example rather than limitation, and may be modified based on the above description with reference to FIG. 1 and FIG. 2. For example, processing of adjusting transmission power of the data blocks in step S34 is optional, and thus the step may be omitted. In addition, a step of transmitting a merging indication to the user equipment from the base station may be added, and in this case, it is unnecessary the user equipment always performs positive merging and demodulates a signal through non-linear interference cancellation as in step S39, but may perform positive merging or negative merging based on the merging indication to eliminate or weaken an interfering signal portion, thereby demodulating a data signal. For example, although the processing coefficients are defined in a form of the layer-time code matrix, the base station terminal may not predefine the layer-time code matrix, but processes a retransmitted signal based on an actual receiving condition. In practice, those skilled in the art may modify the above signaling interaction process in other manners according to the principles of the present disclosure, and all of such modifications fall within the scope of the present disclosure.

A case of downlink transmission has been described above with reference to FIG. 1 to FIG. 3, however, the technology in the present disclosure may be also applied to uplink transmission. A case of uplink transmission is described below with reference to FIG. 4 to FIG. 6.

Figure 4:
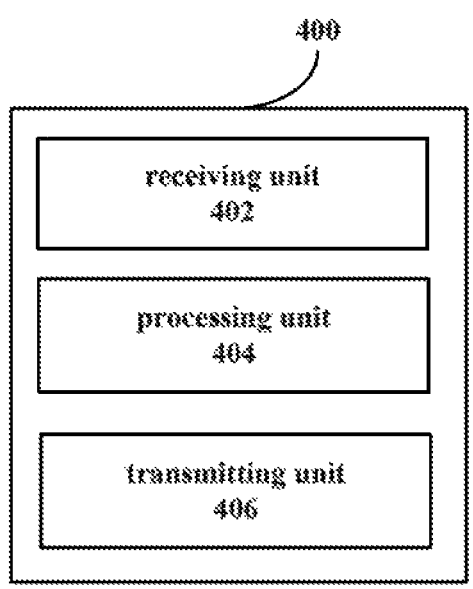
FIG. 4 is a block diagram showing a functional configuration example of a device in a wireless communication system according to yet another embodiment of the present disclosure.

FIG. 4 is a block diagram showing a functional configuration example of a device in a wireless communication system according to yet another embodiment of the present disclosure. The device may be provided in a base station or on a base station side.

As shown in FIG. 4, a device 400 according to the embodiment may include a receiving unit 402, a processing unit 404 and a transmitting unit 406. Functional configuration examples of the above units are described in detail below.

The receiving unit 402 may be configured to receive a first allocation signal. The first allocation signal includes at least a first power signal portion and a second power signal portion transmitted respectively by a first user equipment and a second user equipment on same first radio transmission resources. Specifically, the first user equipment and the second user equipment respectively transmit signals to a base station on same time-frequency resources, and the first allocation signal received at the base station may be equivalent to superposition of the signals from the two user equipment.

The processing unit 404 may be configured to obtain the data from the first user equipment and the data from the second user equipment according to the first allocation signal.

Due to the existence of interference, the processing unit 404 may not correctly obtain the data from the first user equipment and the data from the second user equipment through decoding based on only the first allocation signal. Therefore, the transmitting unit 406 may be configured to transmit a retransmission request to the first user equipment and the second user equipment in a case that the processing unit 404 fails to obtain the data from at least one of the first user equipment and the second user equipment based on the first allocation signal.

It should be understood that the base station may not transmit the retransmission request to the user equipment, data from which has been obtained through decoding, and thus a power signal portion for the user equipment is equal to 0 in the retransmission. In addition, generally speaking, if data from one of the user equipment is failed to be obtained through demodulation, possibility that data from the other user equipment is obtained through demodulation is also small. Therefore, the base station generally transmits the retransmission requests to both of the two user equipment, without excluding a case that the retransmission request is transmitted to only one of the user equipment. For the convenience of description, a case that the base station transmits the retransmission requests to the two user equipment is taken as an example for description, and a case that the base station does not transmit the retransmission request to one of the user equipment is regarded as a special case that a power signal portion from the one user equipment is set to be 0 in the retransmission, which is not separately described here.

Therefore, the receiving unit 402 may further receive a second allocation signal, which may include at least a third power signal portion and a fourth power signal portion respectively transmitted by the first user equipment and the second user equipment on same second radio transmission resources in response to the retransmission request. The third power signal portion and the fourth power signal portion are obtained by respectively processing the first power signal portion and the second power signal portion with predetermined processing coefficients. In a case that the base station transmits the retransmission request to only one of the first user equipment and the second user equipment for example, the third power signal portion or the fourth power signal portion may be set to be 0.

The processing unit 404 may merge the first allocation signal and the second allocation signal to obtain the data from the first user equipment and the data from the second user equipment. Preferably, in the merged first allocation signal and second allocation signal, the first power signal portion and the third power signal portion are eliminated or weakened with respect to each other, or the second power signal portion and the fourth power signal portion are eliminated or weakened with respect to each other. The specific processing of obtaining the third power signal portion and the fourth power signal portion by processing the first power signal portion and the second power signal portion, and eliminating an interfering signal portion through merging operation to thereby obtain data through demodulation may be the same as the processing in the downlink transmission above, which is not described repeatedly anymore herein.

Preferably, as described above, the processing unit 404 may be further configured to execute nonlinear interference cancellation based on a result of the merging. In a case that the data from one of the first user equipment and the second user equipment is obtained through the merging operation as described above, data from the other of the first user equipment and the second user equipment may be derived through for example successive interference cancellation.

Preferably, the processing unit 404 of the base station may determine a transmission power of each of the first power signal portion, the second power signal portion, the third power signal portion and the fourth power signal portion based on a current radio condition, and the transmitting unit 406 transmits power indications to the first user equipment and the second user equipment to inform the first user equipment and the second user equipment of the determined transmission powers, so that the first user equipment and the second user equipment may transmit the first power signal portion, the second power signal portion, the third power signal portion and the fourth power signal portion at respective transmission powers. It should be understood that the transmission powers may be determined in advance instead of being determined by the base station, and in this case, the user equipment may transmit data to the base station at the transmission powers determined in advance.

In addition, preferably, the processing unit 404 may be further configured to determine the first radio transmission resources and the second radio transmission resources, and the transmitting unit 406 may be further configured to transmit resource indications to the first user equipment and the second user equipment to indicate the first radio transmission resources and the second radio transmission resources. Alternatively, the first user equipment and the second user equipment may also transmit data on radio transmission resources determined in advance instead of being determined by the base station.

In addition, the processing unit 404 may be further configured to determine the predetermined processing coefficients, and the transmitting unit 406 may transmit the determined predetermined processing coefficients to the first user equipment and the second user equipment, so that the first user equipment and the second user equipment process the first power signal portion and the second power signal portion with the predetermined processing coefficients to obtain the third power signal portion and the fourth power signal portion. In practice, the predefined processing coefficients may be of course determined in advance, instead of being determined by the base station.

Preferably, the power indications, the resource indications and the predetermined processing coefficients described above may be contained in uplink grant signaling (UL grant) transmitted by the base station through PDCCH.

Figure 5:
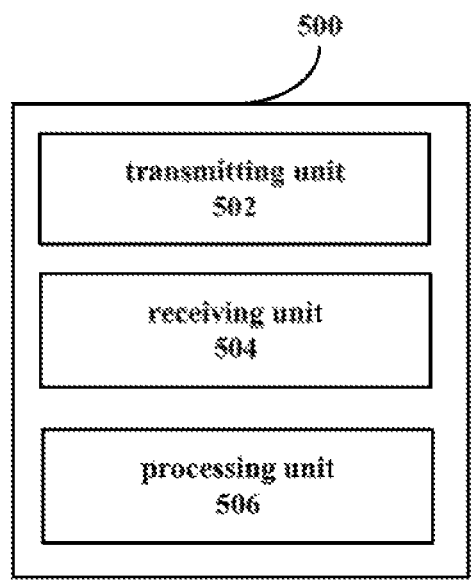
FIG. 5 is a block diagram showing a functional configuration example of a device in a wireless communication system according to still another embodiment of the present disclosure.

Next, a functional configuration example of a device in a wireless communication system according to still another embodiment of the present disclosure is described with reference to FIG. 5. FIG. 5 is a block diagram showing a functional configuration example of a device in a wireless communication system according to still another embodiment of the present disclosure. The device may be provided in a user equipment or on a user equipment side.

As shown in FIG. 5, a device 500 according to the embodiment may include a transmitting unit 502, a receiving unit 504 and a processing unit 506. Functional configuration examples of the above units are described in detail below.

The transmitting unit 502 may be configured to transmit a first power signal portion to a base station at a first transmission power on first radio transmission resources, which are the same as radio transmission resources on which a second user equipment transmits a second power signal portion, and the second user equipment may for example transmit the second power signal portion at a second transmission power. In this way, a signal received by the base station may be equivalent to a superposed signal obtained by superposing the first power signal portion and the second power signal portion.

The receiving unit 504 may be configured to receive a retransmission request from the base station. In a case that the base station fails to obtain data from at least one of the first user equipment and the second user equipment based on the above superposed signal obtained through superposition, the base station may transmit a retransmission request to the first user equipment and the second user equipment.

The processing unit 506 may be configured to process, in response to the retransmission request, the first power signal portion with a predetermined processing coefficient to obtain a third power signal portion. Similarly, the second user equipment may also process, in response to the retransmission request, the second power signal portion with a predetermined processing coefficient to obtain a fourth power signal portion.

The transmitting unit 504 may be further configured to transmit the third power signal portion to the base station at a third transmission power on second radio transmission resources, which are the same as radio transmission resources on which the second user equipment transmits the fourth power signal portion. Thus, the base station may merge the signals in two transmissions to eliminate an interfering signal portion from other user equipment. That is, after performing merging by the base station, the first power signal portion and the third power signal portion are weakened or eliminated with respect to each other, or the second power signal portion and the fourth power signal portion are weakened or eliminated with respect to each other.

As described above, the base station may determine the power for transmitting a data signal, the radio transmission resources for transmitting the data signal and the predetermined processing coefficients for processing a retransmitted signal of the user equipment. The first transmission power and the third transmission power described above may be contained in a power indication from the base station, the first radio transmission resources and the second radio transmission resources may be contained in a resource indication from the base station, and the power indication, the resource indication and the predetermined processing coefficients may be contained in uplink grant signaling transmitted by the base station through PDCCH.

It should be understood that except for the contents described above, the functional configuration examples of the device at the base station and the device at the user equipment in the case of uplink transmission described here with reference to FIG. 4 and FIG. 5 are similar to functional configuration examples of the device at the base station and the device at the user equipment in the case of downlink transmission described above with reference to FIG. 1 and FIG. 2 in terms of many aspects, for example, how to process the retransmitted signal and eliminate interference through merging operation and the like, thus the contents not described in detail here may be referred to foregoing description at corresponding positions, and are not described repeatedly here.

Figure 6:
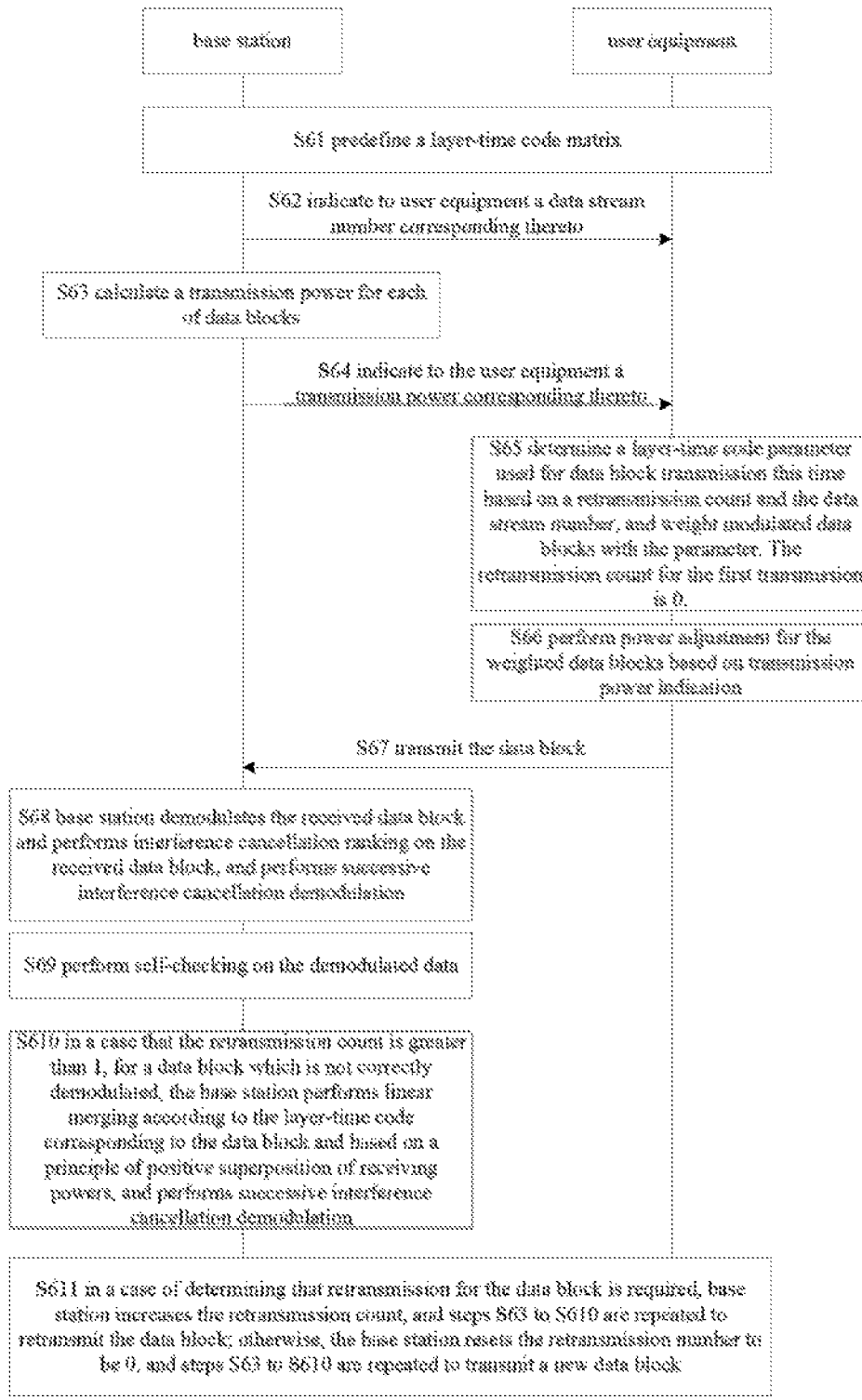
FIG. 6 is a flow diagram showing an example of a signaling interaction process for uplink transmission according to an embodiment of the present disclosure.

A signaling interaction flow for uplink transmission is described next with conjunction with the device at the base station and the device at the user equipment described above. FIG. 6 is a flow diagram showing an example of a signaling interaction process for uplink transmission according to an embodiment of the present disclosure.

As shown in FIG. 6, in step S61, a base station predefines a layer-time code matrix. In step S62, the base station indicates to a user equipment a data stream number corresponding thereto. The base station calculates a transmission power for the user equipment to transmit a data block in step S63, and indicates the transmission power to the user equipment in step S64. In step S65, the user equipment determines a layer-time code parameter for transmitting the data block this time based on a retransmission count and the data stream number, and weights the modulated data block with the layer-time code parameter. For the first transmission, a retransmission count may be set to be 0. Then, the user equipment performs power adjustment for the weighted data block based on a transmission power indication from the base station in step S66, and transmits the data block to the base station in step S67. The base station demodulates the received data block and performs interference cancellation ranking on the received data block and performs successive interference cancellation demodulation in step S68, and performs self-checking on the demodulated data in step S69. In step S610, in a case that the retransmission count is greater than 1, for a data block which is not correctly obtained by demodulating, the user equipment performs linear merging according to the layer-time code corresponding to the data block and based on a principle of positive superposition of receiving powers, and performs successive interference cancellation demodulation. In step S611, in a case of determining that retransmission for the data block is required, the base station increases the retransmission count, and steps S63 to S610 are repeated so that the user equipment retransmits the data block; otherwise, the base station resets the retransmission number to be 0, and steps S63 to S610 are repeated so that the user equipment transmits a new data block.

It should be understood that, as described above, similar to the case of downlink transmission, the above signaling interaction process is only an example rather than limitation, and those skilled in the art may modify the signaling interaction process according to principles of the present disclosure. For example, processing in step S63 is optional, and the transmission power for the user equipment to transmit a data block may be also predetermined. For example, it is not necessary that positive merging is always performed for signals transmitted multiple times as in step S610, and positive merging or negative merging may be executed according to actual needs to reduce calculation load. In practice, those skilled in the art may conceive of other variations of the above signaling interaction process according to the principles of the present disclosure, which are not enumerated here anymore, and all of such variations are regarded to fall within the scope of the present disclosure.

It should be understood that although the functional configuration examples of the devices in the wireless communication system according to the embodiments of the present disclosure and the interaction process examples between communication devices are described above, these are only examples rather than restrictions. Those skilled in the art may modify the above embodiments according to principles of the present disclosure, for example, add, delete and/or combine functional modules in the embodiments, and all of such modifications fall within the scope of the present disclosure.

Corresponding to the above device embodiments, methods in a wireless communication system are further provided according to an embodiment of the present disclosure. Process examples of methods in a wireless communication system according to embodiments of the present disclosure are described in detail below with reference to FIG. 7 to FIG. 10.

Figure 7:
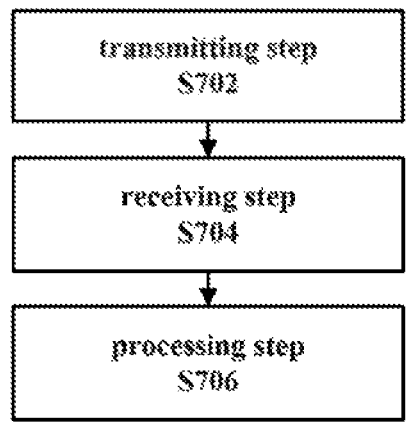
FIG. 7 is a flow diagram showing a process example of a method in a wireless communication system according to an embodiment of the present disclosure.

FIG. 7 is a flow diagram showing a process example of a method in a wireless communication system according to an embodiment of the present disclosure. The method may be executed on the base station side.

As shown in FIG. 7, the method according to the embodiment may include a transmitting step S702, a receiving step S704 and a processing step S706. Processing in each of the steps is described in detail below.

First, in the transmitting step S702, a first allocation signal superposed using superposition coding may be transmitted to multiple user equipment including at least a first user equipment and a second user equipment. The first allocation signal includes at least a first power signal portion for the first user equipment and a second power signal portion for the second user equipment. It can be known according to the principle of superposition coding that a transmission power of the first power signal portion may be greater than or less than a transmission power of the second power signal portion based on radio conditions of the first user equipment and the second user equipment.

In a case that at least one of the first user equipment and the second user equipment fails to obtain the data therefor based on the first allocation signal, at least one of the first user equipment and the second user equipment may transmit a retransmission request to the base station to request retransmitting the signal. In the receiving step S704, a retransmission request fed back from at least one of the first user equipment and the second user equipment may be received.

In the processing step S706, the first power signal portion and the second power signal portion may be processed with predetermined processing coefficients in response to the retransmission request to obtain a second allocation signal. Preferably, the predetermined processing coefficients may be determined based on a Hadamard matrix, that is, the predetermined processing coefficient may be the "layer-time code matrix" described above.

After obtaining the second allocation signal in the processing step S706, the second allocation signal may be further transmitted to the first user equipment and the second user equipment in the transmitting step S702, so that the first user equipment and the second user equipment merge the first allocation signal and the second allocation signal to respectively obtain data for the first user equipment and data for the second user equipment.

According to the above processing, in the merged first allocation signal and second allocation signal, one of the first power signal portion and the second power signal portion is weakened or eliminated, thereby greatly reducing interference from other user equipment when demodulating the data, and greatly improving a possibility of successfully obtaining data through demodulation.

It should be noted that the method described here corresponds to the device embodiment in the wireless communication system described above with reference to FIG. 1, thus contents not described in detail here may be referred to the foregoing description at corresponding positions and are not repeated here anymore.

Figure 8:
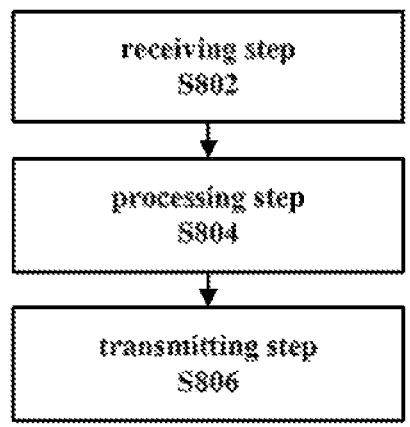
FIG. 8 is a flow diagram showing a process example of a method in a wireless communication system according to another embodiment of the present disclosure.

FIG. 8 is a flow diagram showing a process example of a method in a wireless communication system according to another embodiment of the present disclosure. The method may be executed on the user equipment side.

As shown in FIG. 8, the method according to the embodiment may include a receiving step S802, a processing step S804 and a transmitting step S806. Processing in each of the steps is described in detail below.

In the receiving step S802, a first allocation signal from a base station may be received, the first allocation signal being superposed by superposition coding and including at least a first power signal portion for the first user equipment and a second power signal portion for the second user equipment.

In the processing step S804, data for the first user equipment may be obtained based on the first allocation signal.

In the transmitting step S806, a retransmission request may be transmitted to the base station in a case that the data for the first user equipment is failed to be obtained based on the first allocation signal.

Upon receiving the retransmission request, the base station may retransmit to the user equipment which transmits the retransmission request the data therefor, or may retransmit a superposed signal obtained by superposition coding to the two user equipment. In the receiving step S802, a second allocation signal is further received from the base station, the second allocation signal being obtained by processing, by the base station, the first power signal portion and the second power signal portion with predetermined processing coefficients in response to the retransmission request fed back from at least one of the first user equipment and the second user equipment. It should be understood that, in a case that the base station retransmits data only to the user equipment which transmits the retransmission request, a data signal portion related to other user equipment in the second allocation signal may be regarded to be 0.

Upon receiving the second allocation signal, in the processing step S804, the first allocation signal and the second allocation signal may be merged to obtain data for the first user equipment. Similarly, similar processing may be performed at the second user equipment to obtain data for the second user equipment.

It should be noted that, the method described here corresponds to the device embodiment in the wireless communication system described above with reference to FIG. 2, thus contents not described in detail here may be referred to the foregoing description at corresponding positions and are not repeated here anymore.

The methods described above with reference to FIG. 7 and FIG. 8 are methods executed respectively at the base station and the user equipment in the downlink transmission, and methods executed respectively at the base station and the user equipment in the uplink transmission are described below.

Figure 9:
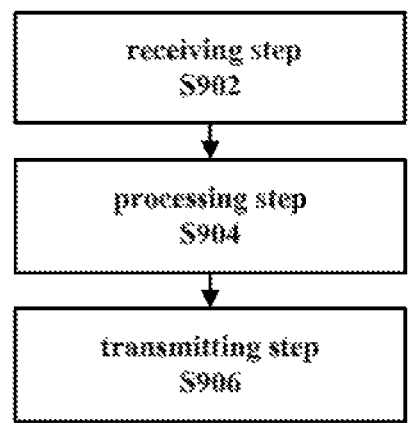
FIG. 9 is a flow diagram showing a process example of a method in a wireless communication system according to yet another embodiment of the present disclosure.

FIG. 9 is a flow diagram showing a process example of a method in a wireless communication system according to yet another embodiment of the present disclosure. The method may be executed on the base station side.

As shown in FIG. 9, the method according to the embodiment may include a receiving step S902, a processing step S904 and a transmitting step S906. Processing in each of the steps is described in detail below.

In the receiving step S902, a first allocation signal may be received, the first allocation signal including at least a first power signal portion and a second power signal portion transmitted respectively by a first user equipment and a second user equipment on same first radio transmission resources. Since the first user equipment and the second user equipment respectively transmit data thereof to the base station on the same time-frequency resources, the signal received by the base station may be equivalent to data obtained by performing superposition coding on the data from the two user equipment.

In the processing step S904, data from the user equipment and data from the second user equipment may be obtained based on the first allocation signal.

In the transmitting step S906, in a case that data from at least one of the first user equipment and the second user equipment is failed to be obtained based on the first allocation signal, a retransmission request is transmitted to the first user equipment and the second user equipment. It is assumed here that the base station transmits the retransmission request to both of the two user equipment, and a case that the base station transmits the retransmission request to only the user equipment for which the data is not demodulated may be regarded as a special case that data retransmitted from the user equipment is 0.

In response to the retransmission request from the base station, the first user equipment and the second user equipment may retransmit data to the base station on same time-frequency resources. In the receiving step S902, the second allocation signal is further received, the second allocation signal including at least a third power signal portion and a fourth power signal portion transmitted by the first user equipment and the second user equipment on the same second radio transmission resources in response to the retransmission request, the third power signal portion and the fourth power signal portion being obtained by processing the first power signal portion and the second power signal portion with predetermined processing coefficients. The predetermined processing coefficients may be predetermined, or may be determined by the base station and then informed to the user equipment. Upon receiving the second allocation signal, in the processing step S904, the first allocation signal and the second allocation signal may be merged to obtain the data from the first user equipment and the data from the second user equipment.

It should be noted that, the method described here corresponds to the device embodiment in the wireless communication system described with reference to FIG. 4, thus contents not described in detail here may be referred to the foregoing description at corresponding positions and are not repeated here anymore.

Figure 10:
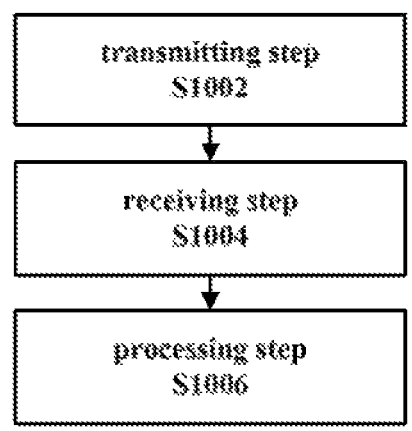
FIG. 10 is a flow diagram showing a process example of a method in a wireless communication system according to still another embodiment of the present disclosure.

FIG. 10 is a flow diagram showing a process example of a method in a wireless communication system according to still another embodiment of the present disclosure. The method may be executed on the user equipment side.

As shown in FIG. 10, the method according to the embodiment may include a transmitting step S1002, a receiving step S1004 and a processing step S1006. Processing in each of the steps is described in detail below.

In the transmitting step S1002, a first power signal portion may be transmitted to a base station at a first transmission power on first radio transmission resources, which are the same as radio transmission resources on which a second user equipment transmits a second power signal portion. That is, the first user equipment and the second user equipment transmit data thereof to the base station on the same time-frequency resources.

In the receiving step S1004, a retransmission request may be received from the base station.

In the processing step S1006, the first power signal portion may be processed with a predetermined processing coefficient in response to the retransmission request to obtain a third power signal portion. Similarly, the second user equipment may process the second power signal portion with a predetermined processing coefficient in response to the retransmission request to obtain a fourth power signal portion.

In the transmitting step S1002, the third power signal portion may be transmitted to the base station at a third transmission power on second radio transmission resources, which are the same as radio transmission resources on which the second user equipment transmits the fourth power signal portion. That is, the first user equipment and the second user equipment transmit the third power signal portion and the fourth power signal portion to the base station on the same time-frequency resources. Thus, the base station may merge the signals transmitted multiple times to weaken or eliminate interference from other user equipment, so as to successfully obtain the user data by demodulating.

It should be understood that the transmission powers for transmitting signals, the radio transmission resources and the predefined processing coefficients used by the respective user equipment may be determined at the base station, and are informed to the user equipment by the base station through for example uplink grant signaling.

It should be noted that the method described here corresponds to the device embodiment in the wireless communication system described above with reference to FIG. 5, thus contents not described in detail here may be referred to the foregoing description at corresponding positions and are not repeated here anymore.

It should be understood that although the process examples of the methods in the wireless communication system according to the embodiments of the present disclosure are described above, these are only examples rather than restrictions. Those skilled in the art can modify the above embodiments according to principles of the present disclosure, for example, add, delete or combine steps in the embodiments, and all of such modifications fall within the scope of the present disclosure.

In addition, it should be noted that, although the process examples of the methods in the wireless communication system according to the embodiments of the present disclosure are described in an order shown in the flow diagrams in the drawings and the above description, an execution order in the methods according to the present disclosure is not limited thereto, and the processing may be executed in parallel or as required.

According to the embodiments of the devices and the methods in the wireless communication system described above, a retransmitted signal in the superposition transmission is processed to weaken or eliminate interference caused by transmission with respect to other user equipment, thereby greatly improving a possibility of successfully obtaining data through demodulation while improving throughput of superposition transmission.

In addition, an electronic device is further provided according to an embodiment of the present disclosure, which may include a transceiver and one or more processors. The one or more processors may be configured to execute the methods or functions of the units in the wireless communication system according to the embodiments of the present disclosure described above.

It is to be understood that the machine-executable instructions in a storage medium and a program product according to an embodiment of the present disclosure may be configured to perform a method corresponding to the above apparatus embodiment, and thus the contents which are not described in detail herein may be referred to the foregoing description at corresponding positions and are not repeated herein.

Accordingly, a storage medium on which the above program product storing machine-executable instructions is carried is also included in the present disclosure. The storage medium includes but not limited to a floppy disk, an optical disk, a magneto-optical disk, a storage card, a memory rod and the like.

Figure 11:
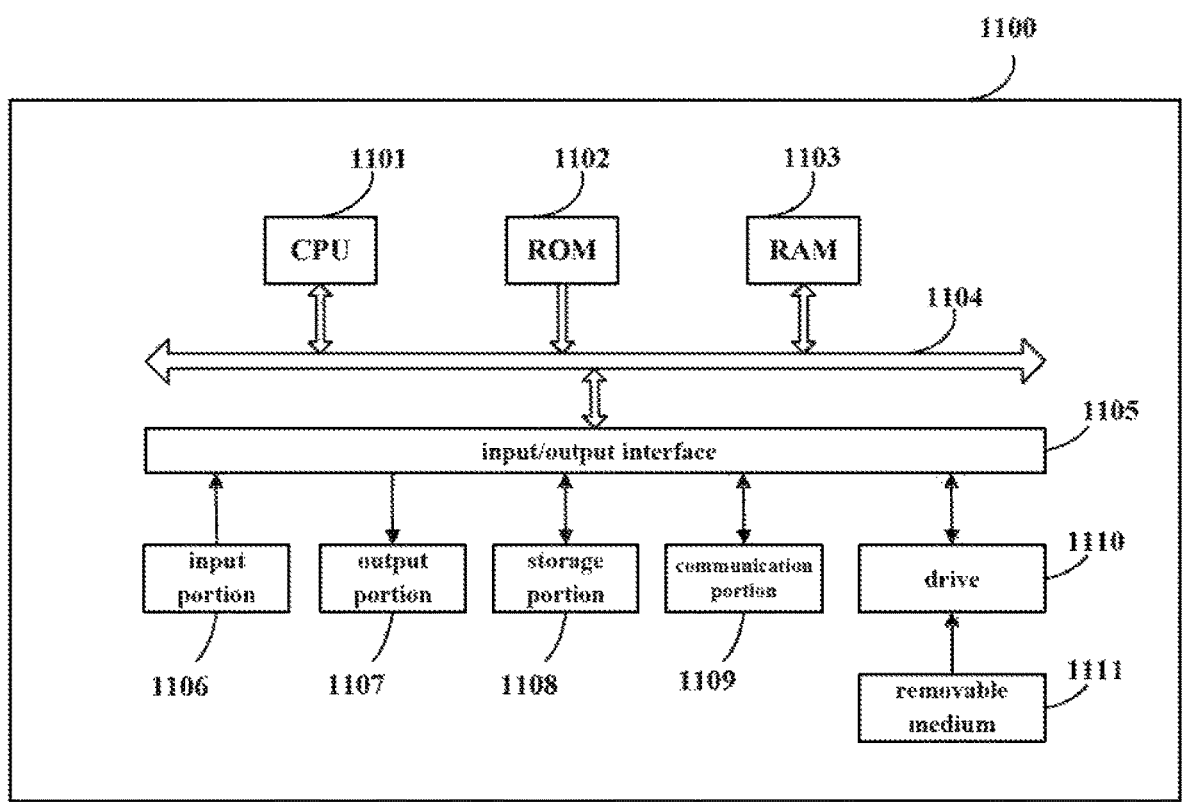
FIG. 11 is a block diagram showing an exemplary structure of a personal computer as an information processing device used in an embodiment of the present disclosure.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 1100 illustrated in FIG. 11, which can perform various functions when various programs are installed thereon. FIG. 11 is a block diagram showing an exemplary structure of a personal computer as an information processing device used in an embodiment of the present disclosure.

In FIG. 11, a Central Processing Unit (CPU) 1101 performs various processes according to a program stored in a Read Only Memory (ROM) 1102 or loaded from a storage portion 1108 into a Random Access Memory (RAM) 1103 in which data required when the CPU 1101 performs the various processes is also stored as needed.

The CPU 1101, the ROM 1102 and the RAM 1103 are connected to each other via a bus 1104 to which an input/output interface 1105 is also connected.

The following components are connected to the input/output interface 1105: an input portion 1106 including a keyboard, a mouse, etc.; an output portion 1107 including a display, e.g., a Cathode Ray Tube (CRT), a Liquid Crystal Display (LCD), etc., a speaker, etc.; a storage portion 1108 including a hard disk, etc.; and a communication portion 1109 including a network interface card, e.g., an LAN card, a modem, etc. The communication portion 1109 performs a communication process over a network, e.g., the Internet.

A drive 1110 is also connected to the input/output interface 1105 as needed. A removable medium 1111, e.g., a magnetic disk, an optical disk, a magneto optical disk, a semiconductor memory, etc., can be installed on the drive 1110 as needed so that a computer program fetched therefrom can be installed into the storage portion 1108 as needed.

In the case that the foregoing series of processes are performed in software, a program constituting the software is installed from a network, e.g., the Internet, etc., or a storage medium, e.g., the removable medium 1111, etc.

Those skilled in the art shall appreciate that such a storage medium will not be limited to the removable medium 1111 illustrated in FIG. 11 in which the program is stored and which is distributed separately from the apparatus to provide a user with the program. Examples of the removable medium 1111 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1102, a hard disk included in the storage portion 1108, etc., in which the program is stored and which is distributed together with the apparatus including the same to the user.

The application examples of the present disclosure are described next with reference to FIG. 12 to FIG. 14.

[Application Example Regarding eNB]

First Application Example

Figure 12:
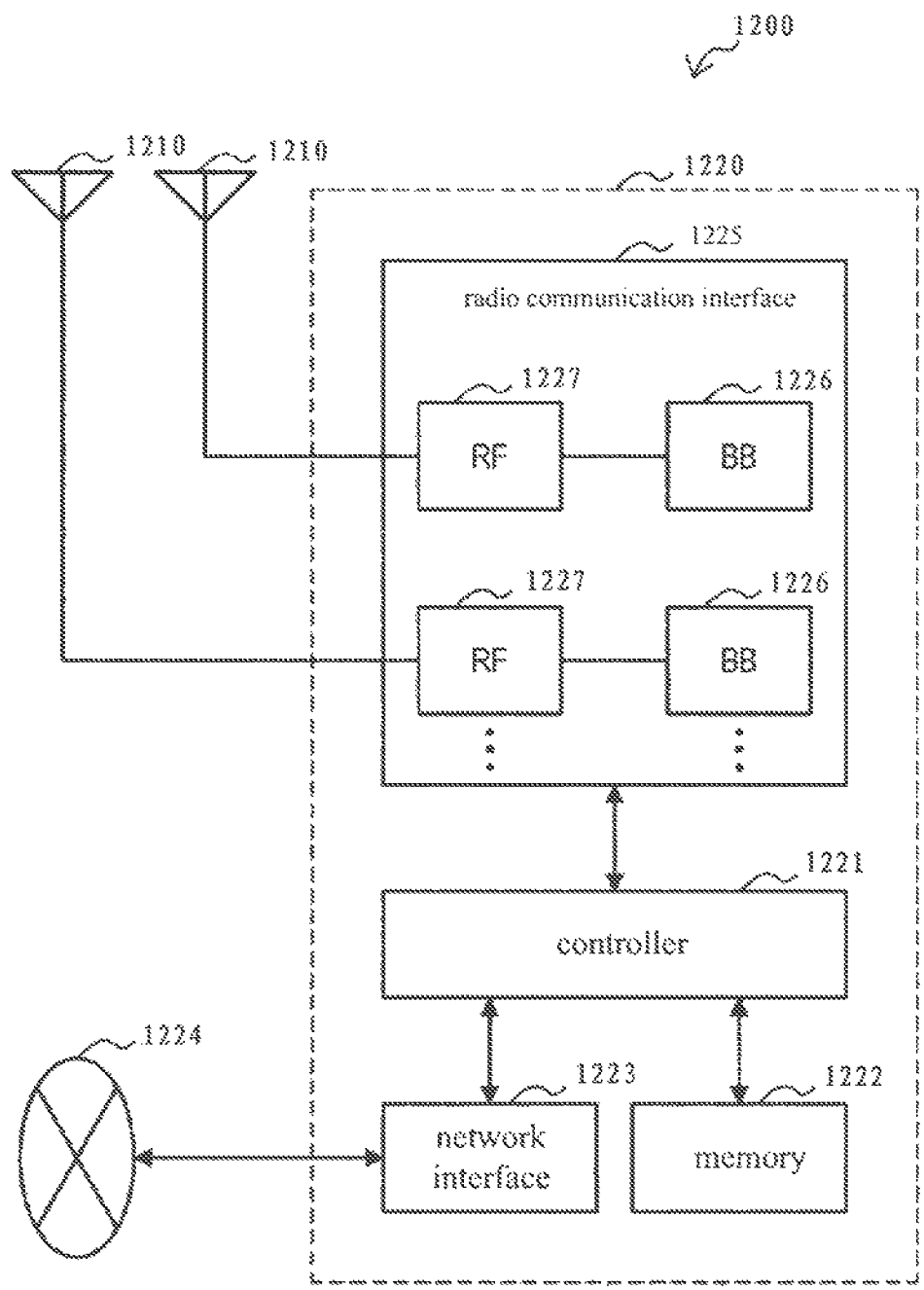
FIG. 12 is a block diagram illustrating a first example of a schematic configuration of an evolved Node B (eNB) to which the technology of the present disclosure may be applied.

FIG. 12 is a block diagram showing a first example of a schematic configuration of an eNB to which the technology according to the present disclosure may be applied. An eNB 1200 includes one or more antennas 1210 and a base station apparatus 1220. The base station apparatus 1220 and each antenna 1210 may be connected to each other via an RF cable.

Each of the antennas 1210 includes a single or multiple antenna elements (such as multiple antenna elements included in a MIMO antenna), and is used for the base station apparatus 1220 to transmit and receive radio signals. The eNB 1200 may include the multiple antennas 1210, as illustrated in FIG. 12. For example, the multiple antennas 1210 may be compatible with multiple frequency bands used by the eNB 1200. Although FIG. 12 illustrates the example in which the eNB 1200 includes the multiple antennas 1210, the eNB 1200 may also include a single antenna 1210.

The base station apparatus 1220 includes a controller 1221, a memory 1222, a network interface 1223, and a radio communication interface 1225.

The controller 1221 may be, for example, a CPU or a DSP, and operates various functions of a higher layer of the base station apparatus 1220. For example, the controller 1221 generates a data packet from data in signals processed by the radio communication interface 1225, and transfers the generated packet via the network interface 1223. The controller 1221 may bundle data from multiple base band processors to generate the bundled packet, and transfer the generated bundled packet. The controller 1221 may have logical functions of performing control such as radio resource control, radio bearer control, mobility management, admission control, and scheduling. The control may be performed in cooperation with an eNB or a core network node in the vicinity. The memory 1222 includes RAM and ROM, and stores a program that is executed by the controller 1221, and various types of control data (such as a terminal list, transmission power data, and scheduling data).

The network interface 1223 is a communication interface for connecting the base station apparatus 1220 to a core network 1224. The controller 1221 may communicate with a core network node or another eNB via the network interface 1223. In that case, the eNB 1200, and the core network node or the other eNB may be connected to each other through a logical interface (such as an S1 interface and an X2 interface). The network interface 1223 may also be a wired communication interface or a radio communication interface for radio backhaul. If the network interface 1223 is a radio communication interface, the network interface 1223 may use a higher frequency band for radio communication than a frequency band used by the radio communication interface 1225.

The radio communication interface 1225 supports any cellular communication scheme such as Long Term Evolution (LTE) and LTE-Advanced, and provides radio connection to a terminal positioned in a cell of the eNB 1200 via the antenna 1210. The radio communication interface 1225 may typically include, for example, a baseband (BB) processor 11226 and an RF circuit 1227. The BB processor 1226 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1226 may have a part or all of the above-described logical functions instead of the controller 1221. The BB processor 1226 may be a memory that stores a communication control program, or a module that includes a processor and a related circuit configured to execute the program. Updating the program may allow the functions of the BB processor 1226 to be changed. The module may be a card or a blade that is inserted into a slot of the base station apparatus 1220. Alternatively, the module may also be a chip that is mounted on the card or the blade. Meanwhile, the RF circuit 1227 may include, for example, a mixer, a filter, and an amplifier, and transmits and receives radio signals via the antenna 1210.

The radio communication interface 1225 may include the multiple BB processors 1226, as illustrated in FIG. 12. For example, the multiple BB processors 1226 may be compatible with multiple frequency bands used by the eNB 1200.

The radio communication interface 1225 may include the multiple RF circuits 1227, as illustrated in FIG. 12. For example, the multiple RF circuits 1227 may be compatible with multiple antenna elements. Although FIG. 12 illustrates the example in which the radio communication interface 1225 includes the multiple BB processors 1226 and the multiple RF circuits 1227, the radio communication interface 1225 may also include a single BB processor 1226 or a single RF circuit 1227.

Second Application Example

Figure 13:
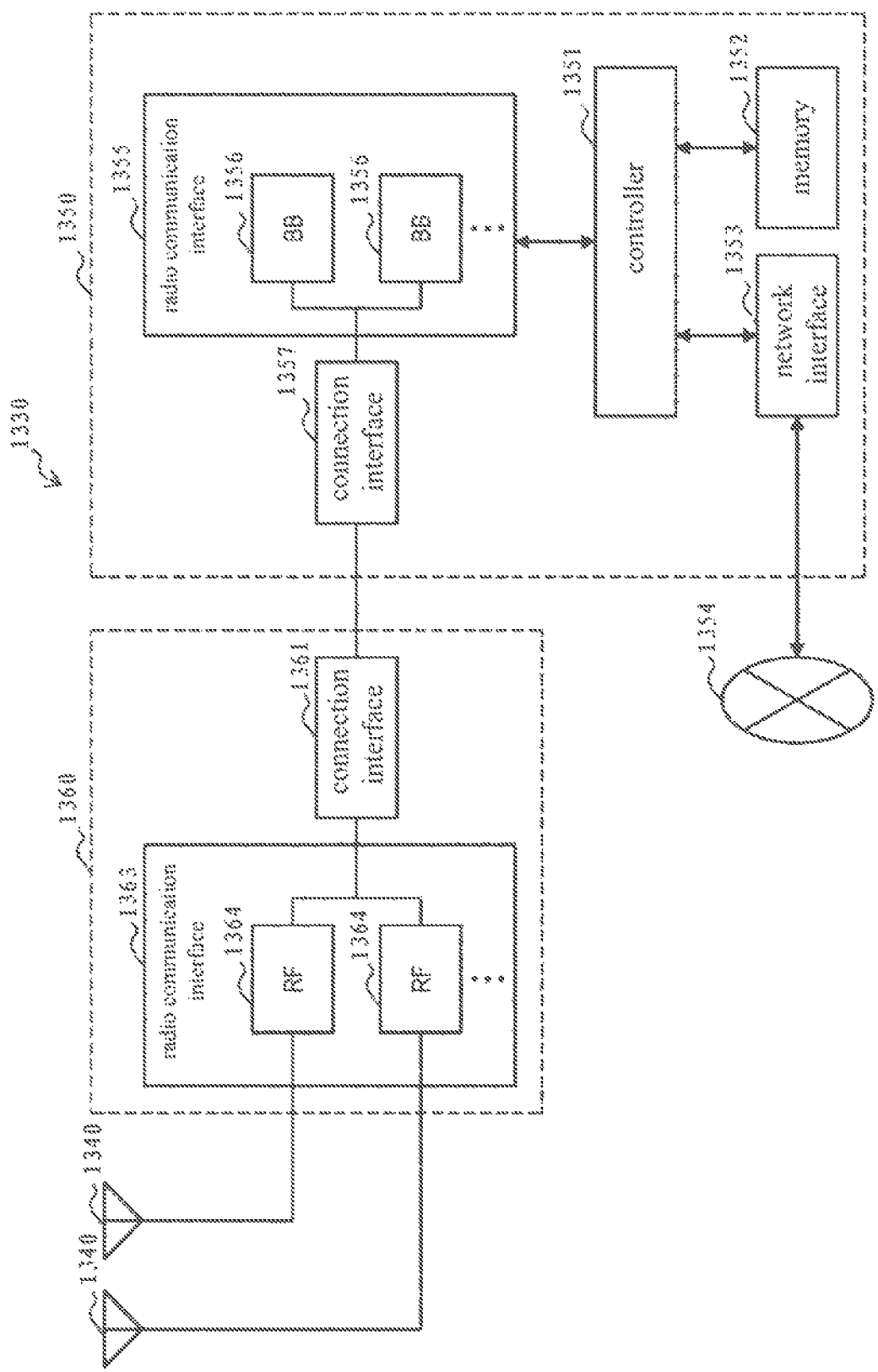
FIG. 13 is a block diagram illustrating a second example of a schematic configuration of an eNB to which the technology of the present disclosure may be applied.

FIG. 13 is a block diagram illustrating a second example of a schematic configuration of an eNB to which the technology of the present disclosure may be applied. An eNB 1330 includes one or more antennas 1340, a base station apparatus 1350, and an RRH 1360. Each antenna 1340 and the RRH 1360 may be connected to each other via an RF cable. The base station apparatus 1350 and the RRH 1360 may be connected to each other via a high speed line such as an optical fiber cable.

Each of the antennas 1340 includes a single or multiple antenna elements (such as multiple antenna elements included in a MIMO antenna), and is used for the RRH 1360 to transmit and receive radio signals. The eNB 1330 may include the multiple antennas 840, as illustrated in FIG. 13. For example, the multiple antennas 1340 may be compatible with multiple frequency bands used by the eNB 1330. Although FIG. 13 illustrates the example in which the eNB 1330 includes the multiple antennas 1340, the eNB 1330 may also include a single antenna 1340.

The base station apparatus 1350 includes a controller 1351, a memory 1352, a network interface 1353, a radio communication interface 1355, and a connection interface 1357. The controller 1351, the memory 1352, and the network interface 1353 are the same as the controller 1221, the memory 1222, and the network interface 1223 described with reference to FIG. 12.

The radio communication interface 1355 supports any cellular communication scheme such as LTE and LTE-Advanced, and provides radio communication to a terminal positioned in a sector corresponding to the RRH 1360 via the RRH 1360 and the antenna 1340. The radio communication interface 1355 may typically include, for example, a BB processor 1356. The BB processor 1356 is the same as the BB processor 1226 described with reference to FIG. 12, except the BB processor 1356 is connected to the RF circuit 1364 of the RRH 1360 via the connection interface 1357. The radio communication interface 1355 may include the multiple BB processors 1356, as illustrated in FIG. 13. For example, the multiple BB processors 1356 may be compatible with multiple frequency bands used by the eNB 1330. Although FIG. 13 illustrates the example in which the radio communication interface 1355 includes the multiple BB processors 1356, the radio communication interface 1355 may also include a single BB processor 1356.

The connection interface 1357 is an interface for connecting the base station apparatus 1350 (radio communication interface 1355) to the RRH 1360. The connection interface 1357 may also be a communication module for communication in the above-described high speed line that connects the base station apparatus 1350 (radio communication interface 1355) to the RRH 1360.

The RRH 1360 includes a connection interface 1361 and a radio communication interface 1363.

The connection interface 1361 is an interface for connecting the RRH 1360 (radio communication interface 1363) to the base station apparatus 1350. The connection interface 1361 may also be a communication module for communication in the above-described high speed line.

The radio communication interface 1363 transmits and receives radio signals via the antenna 1340. The radio communication interface 1363 may typically include, for example, the RF circuit 1364. The RF circuit 1364 may include, for example, a mixer, a filter, and an amplifier, and transmits and receives radio signals via the antenna 1340. The radio communication interface 1363 may include multiple RF circuits 1364, as illustrated in FIG. 13. For example, the multiple RF circuits 1364 may support multiple antenna elements. Although FIG. 13 illustrates the example in which the radio communication interface 1363 includes the multiple RF circuits 1364, the radio communication interface 1363 may also include a single RF circuit 1364.

In the eNB 1200 and the eNB 1300 shown in FIG. 12 and FIG. 13, the transmitting unit and the receiving unit described by using FIG. 1 and FIG. 4 may be implemented by the radio communication interface 1225 and the radio communication interface 1355 and/or the radio communication interface 1363. At least a part of the functions of the processing unit in the device on the base station side in the wireless communication system may also be implemented with the controller 1221 and the controller 1351.

[Application Example Regarding User Equipment]

Figure 14:
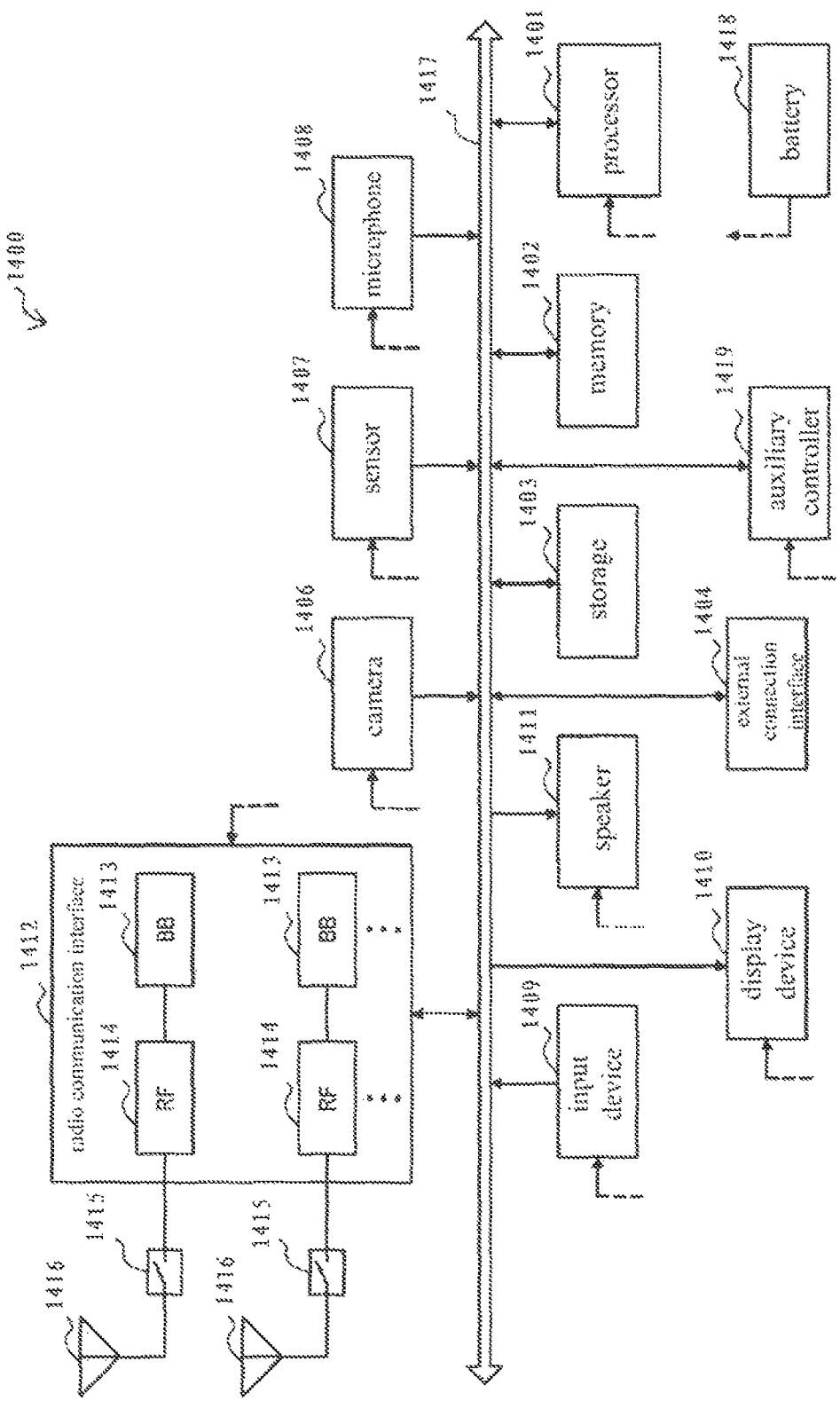
FIG. 14 is a block diagram illustrating an example of a schematic configuration of a smartphone to which the technology of the present disclosure may be applied.

FIG. 14 is a block diagram illustrating an example of a schematic configuration of a smartphone 1400 to which the technology of the present disclosure may be applied. The smartphone 1400 includes a processor 1401, a memory 1402, a storage 1403, an external connection interface 1404, a camera 1406, a sensor 1407, a microphone 1408, an input device 1409, a display device 1410, a speaker 1411, a radio communication interface 1412, one or more antenna switches 1415, one or more antennas 1416, a bus 1417, a battery 1418, and an auxiliary controller 1419.

The processor 1401 may be for example a CPU or a system on chip (SoC), and controls functions of an application layer and another layer of the smartphone 1400. The memory 1402 includes a RAM and a ROM, and stores a program executed by the processor 1401, and data. The storage 1403 may include a storage medium such as a semiconductor memory and a hard disk. The external connection interface 1404 is an interface for connecting an external device such as a memory card and a universal serial bus (USB) device to the smartphone 1400.

The camera 1406 includes an image sensor such as a charge-coupled device (CCD) and a complementary metal oxide semiconductor (CMOS), and generates a captured image. The sensor 1407 may include a group of sensors such as a measurement sensor, a gyroscope sensor, a geomagnetic sensor and an acceleration sensor. The microphone 1408 converts sounds inputted to the smartphone 1400 to audio signals. The input device 1409 includes, for example, a touch sensor configured to detect touch onto a screen of the display device 1410, a keypad, a keyboard, a button or a switch, and receives an operation or information inputted from the user. The display device 1410 includes a screen such as a liquid crystal display (LCD) and an organic light-emitting diode (OLED) display, and displays an output image of the smartphone 1400. The speaker 1411 converts audio signals outputted from the smartphone 1400 into sounds.

The radio communication interface 1412 supports any cellular communication scheme such as LTE and LTE-advanced, and performs radio communication. The radio communication interface 1412 may typically include for example a BB processor 1413 and an RF circuit 1414. The BB processor 1413 may execute for example encoding/decoding, modulation/demodulation and multiplexing/demultiplexing, and execute various types of signal processing for radio communication. Meanwhile, the RF circuit 1414 may include for example a mixer, a filter and an amplifier, and transmits and receives a radio signal via the antenna 1416. The radio communication interface 1412 may be a one chip module having the BB processor 1413 and the RF circuit 1414 integrated thereon. As shown in FIG. 14, the radio communication interface 1412 may include multiple BB processors 1413 and multiple RF circuits 1414. Although FIG. 14 illustrates the example in which the radio communication interface 1412 includes multiple BB processors 1413 and multiple RF circuits 1414, the radio communication interface 1412 may also include a single BB processor 1413 and a single RF circuit 1414.

Furthermore, in addition to the cellular communication scheme, the radio communication interface 1412 may support other types of radio communication scheme, such as a short-distance wireless communication scheme, a near field communication scheme and a wireless local area network (LAN) scheme. In this case, the radio communication interface 1412 may include the BB processor 1413 and the RF circuit 1414 for each radio communication scheme.

Each of the antenna switches 1415 switches connection destinations of the antennas 1416 among multiple circuits (for example, circuits for different radio communication schemes) included in the radio communication interface 1412.

Each of the antennas 1416 includes a single or multiple antenna elements (for example, multiple antenna elements included in the AMMO antenna), and is used for the radio communication interface 1412 to transmit and receive radio signals. As shown in FIG. 14, the smartphone 1400 may include multiple antennas 1416. Although FIG. 14 illustrates the example in which the smartphone 1400 includes multiple antennas 1416, the smartphone 1400 may include a single antenna 1416.

In addition, the smartphone 1400 may include an antenna 1416 for each radio communication scheme. In this case, the antenna switches 1415 may be omitted from the configuration of the smartphone 1400.

The bus 1417 connects the processor 1401, the memory 1402, the storage 1403, the external connection interface 1404, the camera 1406, the sensor 1407, the microphone 1408, the input device 1409, the display device 1410, the speaker 1411, the radio communication interface 1412 and the auxiliary controller 1419 to each other. The battery 1418 supplies power to blocks in the smartphone 1400 shown in FIG. 14 via feeder lines, which are partially shown as dashed lines in the figure. The auxiliary controller 1419 operates a minimum necessary function of the smartphone 1400, for example, in a sleep mode.

In the smartphone 1400 shown in FIG. 14, the transmitting unit and the receiving unit described by using FIG. 2 and FIG. 5 may be implemented by the radio communication interface 1412. At least a part of the functions of the processing unit in the device on the user equipment side described above may be implemented by the processor 1401 or the auxiliary controller 1419.

Preferred embodiments of the present disclosure are described with reference to the drawings above, but the present disclosure is of course not limited to the above examples. Those skilled in the art may make various alternations and modifications within the scope of the appended claims, and it should be understood that these alternations and modifications naturally fall within the technical scope of the present disclosure.

For example, in the above embodiments, multiple functions included in one unit may be implemented by separated devices. Alternatively, in the above embodiments, multiple functions implemented by multiple units may be implemented by separated devices. In addition, one of the above functions may be implemented by multiple units. As a matter of course, such configuration is included in the technical scope of the present disclosure.

In the description, steps described in the flowcharts not only include processing performed chronically in the order described, but also include processing performed concurrently or separately but not necessarily chronically. In addition, even if in steps performed chronically, as a matter of course, the order may be also changed appropriately.

The invention claimed is:

1. An electronic device in a wireless communication network comprising:
   circuitry, configured to
   allocate a first transmission power to a first data signal of a far user equipment and a second transmission power to a second data signal of a near user equipment,
   generate a first superposed data signal by superposing the first data signal on the second data signal,
   transmit the first superposed data signal to the far user equipment and the near user equipment using same transmission resources,
   in response to a NACK HARQ feedback from any one of the far user equipment and the near user equipment, re-allocate a third transmission power to the first data signal and a fourth transmission power to the second data signal, and generate a second superposed data signal by superposing the first data signal on the second data signal, and
   transmit the second superposed data signal to at least the one of the far user equipment and the near user equipment which transmits the NACK HARQ feedback.

2. The electronic device according to claim 1, wherein the first data signal and the second data signal are allocated with different transmission powers based on certain ratio before superposition.

3. The electronic device according to claim 2, wherein the first data signal is allocated with higher transmission power than for the second data signal.

4. The electronic device according to claim 1, wherein the circuitry is further configured to generate the second superposed data signal by superposing the first data signal on the second data signal based on predetermined processing coefficients.

5. The electronic device according to claim 4, wherein the circuitry is further configured to weight the first data signal and the second data signal with the predetermined processing coefficients and then superpose the first and second data signal.

6. The electronic device according to claim 1, wherein the circuitry is further configured to comprise indication of the transmission power allocations to the far user equipment and the near user equipment in Physical Downlink Control Channel to notify the far user equipment and the near user equipment.

7. The electronic device according to claim 4, wherein the circuitry is further configured to comprise indication of the predetermined processing coefficients in Physical Downlink Control Channel to notify the far user equipment and the near user equipment.

8. The electronic device according to claim 1, wherein the electronic device is implemented as a base station in the wireless communication network.

9. An electronic device in a wireless communication network comprising:
   circuitry, configured to
   receive a first superposed data signal from a base station which comprises a first data signal with a first transmission power of a far user equipment superposed on a second data signal with a second transmission power of a near user equipment,
   decode the second data signal from the first superposed data signal,
   if fail to decode the second data signal, transmit a NACK HARQ feedback to the base station,
   receive, from the base station, a second superposed data signal which comprises the first data signal with a third transmission power superposed on the second data signal with a fourth transmission power in response to transmission of a NACK HARQ feedback to the base station, and
   decode the second data signal based on the first superposed data signal and the second superposed data signal.

10. The electronic device according to claim 9, wherein the first data signal and the second data signal are allocated with different transmission powers based on certain ratio before superposition.

11. The electronic device according to claim 10, wherein the first data signal is allocated with higher transmission power than the second data signal.

12. The electronic device according to claim 9, wherein the second superposed data signal is generated by the base station by superposing the first data signal on the second data signal based on predetermined processing coefficients.

13. The electronic device according to claim 12, wherein the first data signal and the second data signal are weighted with the predetermined processing coefficients and then superposed.

14. The electronic device according to claim 9, wherein the circuitry is further configured to receive a Physical Downlink Control Channel to identify indication of the transmission power allocations to the far user equipment and the near user equipment.

15. The electronic device according to claim 12, wherein the circuitry is further configured to receive Physical Downlink Control Channel to identify indication of the predetermined processing coefficients.

16. The electronic device according to claim 13, wherein the circuitry is configured to combine the first superposed data signal and the second superposed data signal based on the predetermined processing coefficients and then decode the second data signal.

17. The electronic device according to claim 9, wherein the electronic device is implemented as the near user equipment in the wireless communication network.

18. A method for a base station in a wireless communication network comprising:
   allocating a first transmission power to a first data signal of a far user equipment and a second transmission power to a second data signal of a near user equipment;
   generating a first superposed data signal by superposing the first data signal on the second data signal;
   transmitting the first superposed data signal to the far user equipment and the near user equipment using same transmission resources;

in response to a NACK HARQ feedback from any one of the far user equipment and the near user equipment, re-allocating a third transmission power to the first data signal and a fourth transmission power to the second data signal, and generating a second superposed data signal by superposing the first data signal on the second data signal; and transmitting the second superposed data signal to at least the one of the far user equipment and the near user equipment which transmits the NACK HARQ feedback.

19. A method for a user equipment in a wireless communication network comprising:

receiving a first superposed data signal from a base station which comprises a first data signal with a first transmission power of a far user equipment superposed on a second data signal with a second transmission power of a near user equipment;

decoding the second data signal from the first superposed data signal;

if fail to decode the second data signal, transmitting a NACK HARQ feedback to the base station;

receiving, from the base station, a second superposed data signal which comprises the first data signal with a third transmission power superposed on the second data signal with a fourth transmission power in response to transmission of a NACK HARQ feedback to the base station; and decoding the second data signal based on the first superposed data signal and the second superposed data signal.

20. A non-transitory computer readable storage medium including executable instructions, which when executed by an information processing machine cause the information processing machine to execute a method for a user equipment, the method comprising:

receiving a first superposed data signal from a base station which comprises a first data signal with a first transmission power of a far user equipment superposed on a second data signal with a second transmission power of a near user equipment;

decoding the second data signal from the first superposed data signal;

if fail to decode the second data signal, transmitting a NACK HARQ feedback to the base station;

receiving, from the base station, a second superposed data signal which comprises the first data signal with a third transmission power superposed on the second data signal with a fourth transmission power in response to transmission of a NACK HARQ feedback to the base station; and decoding the second data signal based on the first superposed data signal and the second superposed data signal.

* * * * *